US010308900B2

(12) United States Patent
Fernandes et al.

(10) Patent No.: US 10,308,900 B2
(45) Date of Patent: Jun. 4, 2019

(54) OCCULT PARTICLES FOR USE IN GRANULAR LAUNDRY CARE COMPOSITIONS

(71) Applicant: Milliken & Company, Spartanburg, SC (US)

(72) Inventors: Gregory E. Fernandes, Greenville, SC (US); Raj Vachhani, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 193 days.

(21) Appl. No.: 15/276,829

(22) Filed: Sep. 27, 2016

(65) Prior Publication Data

US 2017/0175051 A1    Jun. 22, 2017

Related U.S. Application Data

(60) Provisional application No. 62/270,879, filed on Dec. 22, 2015.

(51) Int. Cl.
| | | |
|---|---|---|
| *C11D 3/40* | (2006.01) | |
| *C11D 3/42* | (2006.01) | |
| *C11D 17/06* | (2006.01) | |
| *C09B 67/08* | (2006.01) | |
| *C09B 67/42* | (2006.01) | |
| *C11D 3/12* | (2006.01) | |
| *C11D 17/00* | (2006.01) | |

(52) U.S. Cl.
CPC ............ *C11D 3/42* (2013.01); *C09B 67/0007* (2013.01); *C09B 67/0092* (2013.01); *C09B 67/0095* (2013.01); *C11D 3/126* (2013.01); *C11D 3/40* (2013.01); *C11D 17/0034* (2013.01); *C11D 17/06* (2013.01); *C11D 3/1253* (2013.01)

(58) Field of Classification Search
CPC .................................... C11D 3/40; C11D 3/42

USPC ......................................................... 510/276
See application file for complete search history.

(56) References Cited

U.S. PATENT DOCUMENTS

| | | | |
|---|---|---|---|
| 3,931,037 A | 1/1976 | Hall ............................... | 252/135 |
| 4,193,888 A | 3/1980 | McHugh ......................... | 252/99 |
| 8,318,652 B2 | 11/2012 | Fernandes et al. ............ | 510/349 |
| 8,470,760 B2 | 6/2013 | Spanhove et al. ............. | 510/438 |
| 8,476,216 B2 | 7/2013 | Fernandes ...................... | 510/349 |
| 8,921,301 B2 | 12/2014 | Spanhove et al. ............. | 510/438 |
| 2005/0227890 A1* | 10/2005 | Van Dijk ................. | C11D 3/40 510/276 |
| 2006/0111264 A1 | 5/2006 | Smets et al. ................... | 510/475 |
| 2013/0281349 A1 | 10/2013 | Batchelor et al. ............ | 510/356 |
| 2013/0303428 A1 | 11/2013 | Fernandes ...................... | 510/324 |
| 2013/0303429 A1 | 11/2013 | Stenger et al. ................ | 510/324 |
| 2016/0326467 A1* | 11/2016 | Qin .......................... | C09B 11/06 |

FOREIGN PATENT DOCUMENTS

| | | | | |
|---|---|---|---|---|
| EP | 1 586 629 | 10/2005 | | |
| EP | 1586629 A1 * | 10/2005 | .............. | C11D 3/40 |
| EP | 2 166 077 | 3/2010 | | |
| WO | WO 2007/096052 | 8/2007 | | |
| WO | WO-2007096052 A1 * | 8/2007 | ............. | C11D 3/046 |

OTHER PUBLICATIONS

Patent Cooperation Treaty PCT International Search Report. dated Jan. 19, 2017. International Application No. PCT/US2016/054319. International Filing Date, Sep. 29, 2016.

\* cited by examiner

*Primary Examiner* — Gregory E Webb
(74) *Attorney, Agent, or Firm* — Brenda D. Wentz

(57) ABSTRACT

This invention relates to non-bleeding, non-staining occult particles for use in granular or powdered laundry care compositions such as laundry detergents, laundry aids, and fabric care compositions. The occult particles are comprised of a clay carrier and a coloring agent and are characterized as being substantially indiscernible when contained in the laundry care composition.

29 Claims, No Drawings

OCCULT PARTICLES FOR USE IN GRANULAR LAUNDRY CARE COMPOSITIONS

CROSS REFERENCE TO RELATED APPLICATIONS

This application claims priority to U.S. Provisional Patent Application No. 62/270,879, entitled "Occult Particles For Use In Granular Laundry Care Compositions" which was filed on Dec. 22, 2015, and which is entirely incorporated by reference herein.

FIELD OF THE INVENTION

This invention relates to non-bleeding, non-staining occult particles for use in granular or powdered laundry care compositions such as laundry detergents, laundry aids, and fabric care compositions. The occult particles are comprised of a clay carrier and a coloring agent and are characterized as being substantially indiscernible when contained in the laundry care composition.

BACKGROUND OF THE INVENTION

Consumer demand has previously created the need for hueing of textile substrates without staining to provide a whitening effect for the treated substrates. The solution to this problem resulted in colored speckles being added to detergents. These colored speckles are visually apparent to the consumer as being lightly colored particles among the non-colored (i.e. white) particles of the actual detergent. However, more recently, there is a demand for the same whitening effect without the visual appearance of colored speckles in the granular detergent. Thus, the need exists for materials for use in laundry care compositions (such as laundry detergent compositions, laundry aids, and fabric care compositions) and other consumer products that are indiscernible in these compositions, yet they provide an equivalent whitening effect to the textile substrates treated therewith without bleeding into the surrounding composition and without staining the substrates that come into contact with the materials.

The occult particles of the present disclosure are ideally suited for providing all of these consumer-desired features to the powdered or granular laundry care compositions (such as laundry detergent compositions, laundry aids, and fabric care compositions). The occult particles provide an aesthetically-pleasing whitening effect to textile substrates treated therewith. They are non-staining to the treated substrates. They also resist bleeding or transferring to the surrounding laundry care composition. Furthermore, the occult particles of the present disclosure provide release of color, or other actives, from the clay carrier and provide desirable color to the wash water. For these reasons, and others that will be described herein, the present occult particles represent a useful advance over the prior art. It is understood that the occult particles of the present disclosure are also ideally suited for providing other consumer-desired features, such as, for example, coloring of wash water and color-change effects.

BRIEF SUMMARY OF THE INVENTION

In one aspect, the invention relates to an occult particle comprising: a) a majority by weight of at least one carrier material, and b) at least one color premix material, wherein the color premix material is comprised of: (i) at least one cut color wherein the cut color contains less than 25 wt % of a tertiary aromatic amine, and (ii) at least one diluent having R>1, and wherein the at least one carrier material and the at least one color premix material form a carrier-color premix composite; and wherein the carrier-color premix composite is substantially indiscernible in a non-colored granular or powdered laundry care composition.

In another aspect, the invention relates to an occult particle comprising: a) a majority by weight of at least one clay carrier material, and b) at least one color premix material, wherein the color premix material is comprised of: (i) at least one polymeric colorant cut with a solvent or mixture of solvents or solvent system such that the cut polymeric colorant contains less than 25 wt % of a tertiary aromatic amine, (ii) at least one diluent having R>1, and wherein the at least one carrier material and the at least one color premix material form a carrier-color premix composite; and wherein the carrier-color premix composite is substantially indiscernible in a non-colored granular or powdered laundry care composition.

In a further aspect, the invention relates to a process for producing occult particles comprising the following steps: (a) add at least one solvent to at least one pure, uncut coloring agent; (b) mix the at least one solvent with the pure coloring agent to provide a cut color that contains <25 wt % of a tertiary aromatic amine solvent; (c) add at least one diluent for which R>1 to the cut color; (d) mix the at least one diluent and the cut color; (e) add the mixture from step "d" to at least one carrier material; (f) mix the mixture from "d" and the at least one carrier material to form a carrier-cut color composite; and (g) perform a particle size-based separation step and a re-grinding step to achieve optimal size distribution for occult effect and bleed stability.

DETAILED DESCRIPTION OF THE INVENTION

All U.S. and foreign patents and patent applications disclosed in this specification are hereby incorporated by reference in their entirety.

The present disclosure relates to non-bleeding and non-staining occult particles for use in granular or powdered laundry care compositions (such as laundry detergent compositions, laundry aids, and fabric care compositions). The particles are characterized in that they hide and/or greatly reduce the appearance of the hueing agent in non-colored (i.e. white) granular powdered detergent. The occult particles of the present invention may also find applications in other consumer products outside powdered or granular detergent compositions, such as laundry detergent compositions, laundry aids, and fabric care compositions. For example, the occult particles may be incorporated into tablets (such as toilet pucks and/or appliance cleaning tablets) or film-encased compositions (such as dishwasher detergents).

The occult particles are comprised of a clay carrier and a coloring agent. Herein, the present disclosure describes an occult particle and a method for making the occult particle which results in release of the coloring agent into wash water while reducing, or even eliminating, color migration or bleed on powdered detergent.

The term "non-staining" as used herein, generally refers to a coloring agent, or a composition that contains such a coloring agent, that may be washed or removed from substrate surfaces (e.g. skin, fabric, wood, concrete) with relatively little effort and without staining the substrate to an appreciable extent.

The term "non-bleeding," as used herein, generally refers to a coloring agent-containing composition that does not substantially color the material surrounding the composition under conditions wherein the material is not intended to be colored. For example, the occult particles of the present invention will generally be considered to be "non-bleeding" if the occult particles fail to substantially color the surrounding powdered detergent in its unused state (i.e. while it remains in the package).

The term "water-insoluble" or "minimally water soluble," as used herein, generally refers to a material whose solubility in water at 20° C. and 1 atmosphere of pressure is less than 0.1 grams/100 ml of water.

The term "water-soluble," as used herein, generally refers to a material whose solubility in water at 20° C. and 1 atmosphere of pressure is greater than 0.1 grams/100 ml of water.

The term "carrier-coloring agent composite" as used herein refers to a material or "carrier" (clay or other, single component or multi-component, powder or granule) that has at least some part of its surface in contact with a color or coloring agent. The color or coloring agent may be absorbed and/or adsorbed to the surface of the carrier.

The term "pure color," as used herein, generally refers to a coloring agent that is free from solvent. The pure color may, however, include salts and other impurities typically found in the coloring agent as a result of its manufacturing process.

The term "cut color," as used herein, generally refers to a coloring agent that contains a certain amount of solvent.

The term "color value" or "CV" or "absorbance value," as used herein, generally refers to a parameter used to quantify the concentration of "pure color" in "cut color".

For example: If an absorbance of approximately 1.0 is recorded (peak or maximum absorbance value within the visible spectrum, i.e. 390-700 nm) for a 0.01 g/L solution of "pure" coloring agent using a 1 cm cuvette, then, the "color value" or "CV" or "absorbance value" of the "pure" coloring agent is defined as 1.0/0.01 g/L=100. A 5 wt % solution of "pure" coloring agent in solvent ("cut color") will be expected to record a "color value" or "CV" or "absorbance value" of 5.

The term "solvent or solvent system" generally refers to a molecule or a mixture of molecules that can dissolve enough pure color in it to produce a solution having at least 0.5 wt % of pure color and includes mixtures of solvents.

The term "diluent" refers to a molecule of mixture of molecules that is added to the "cut color," prior to application of the "cut color" to the carrier material, and includes mixtures of diluents.

The term "color premix" refers to a mixture of cut color and diluent.

Carrier Material

The carrier material is preferably in the form of a powder which is characterized by having a majority of its particles under 500 microns in size. In one aspect, the carrier material may be in the form of a powder which is characterized by having a majority of its particles under 250 microns in size. The occult particle may be comprised of a majority by weight of the carrier material. The material used to produce the hidden/occult particle may be characterized as a water dispersible material. Suitable carrier materials include, but are not limited to, clays, silicas (including fumed silica), zeolites, metal oxides, diatomaceous earth, mica, talc, chalk, gypsum-containing compounds, leaded zinc oxide, zinc oxide, zinc sulfide, lithopone, titanium dioxide, calcium sulfate, antimony oxide, magnesium silicate, barytes, basic lead carbonate, calcium carbonate, calcium sulfate, barium sulfate, calcium silicate, silica flatting agents, aluminum silicate including hydrous aluminum silicates, magnesium silicates, calcium metasilicate, sodium-potassium-aluminum silicate, and the like, and combinations thereof.

Examples of clay materials include bentonite, kaolin, smectite, illite, chlorite, hormite, beidelite, sepiolite, alunite, hydrotalcite, nontronite, hectorite, attapulgite, pim elite, muscovite, willemseite, minnesotaite, antigorite, amesite, china clay, halloysite, and the like, and combinations thereof. Commercially available examples of suitable clay carriers include Montmorillonite (powdered bentonite clay, 200 mesh, sodium saturated, Cat. No. 470025-428) available through VWR, Quest Bentonite powders available through AMCOL/MTI, and SPV Bentonite available through AMCOL/MTI.

Bentonites are clays that are comprised primarily of, and whose properties are typically dictated by a smectite clay mineral (e.g. montmorillonite, hectorite, nontronite, etc.). Smectites are generally comprised of stacks of negatively charged layers (wherein each layer is comprised of two tetrahedral sheets attached to one octahedral sheet; the tetrahedra formed by silicon and oxygen atoms and the octahedra formed by aluminum and oxygen atoms together with hydroxyl radicals) balanced and/or compensated by alkaline earth metal cations (e.g. $Ca^{2+}$ and/or $Mg^{2+}$) and/or alkali metal cations (e.g. $Na^+$ and/or $K^+$). The relative amounts of the two types (alkaline earth metal and alkali metal) of cations typically determine the swelling characteristic of the clay material when placed in water. Bentonites, in which the alkaline earth metal cation $Ca^{2+}$ is predominant (or is in a relative majority), are called calcium bentonites; whereas, bentonites in which the alkali metal cation $Na^+$ is predominant (or is in a relative majority) are called sodium bentonites.

The term "natural," as used herein with respect to clay material, refers to the presence of the mineral in deposits found in the earth (formed for example via modification of volcanic ash deposits in marine basins by geological processes). Accordingly, a natural deposit of bentonite containing primarily (or a relative majority of) $Na^+$ cations is referred to as "natural sodium bentonite;" whereas, a natural deposit of a bentonite predominantly containing (or containing a relative majority of) $Ca^{2+}$ cations is referred to as "natural calcium bentonite."

Synthetic analogues of Na and Ca bentonite may also be synthesized (by using hydrothermal techniques, for example). "Synthetic sodium bentonite" may also refer to bentonite obtained by treatment of calcium bentonite with, but not limited to, sodium carbonate or sodium oxalate (to remove the calcium ion and substitute it with a sodium ion). This treatment can be varied to impart different levels of ion-exchange or $Na^+$ for $Ca^{2+}$ substitution. Herein, these materials are referred to as "partially activated" and "fully activated" grades of clay material, respectively (with "fully" referring to maximum exchange of $Ca^{2+}$ for $Na^+$).

One of the reasons for converting calcium bentonite into synthetic sodium bentonite is to impart greater swelling properties to otherwise (relatively) non-swelling calcium bentonite. There is also an aesthetic benefit associated with synthetic sodium bentonite that is lacking in natural sodium bentonite. Natural sodium bentonite (generally, irrespective of the part of the world in which the deposit is located) tends to be colored. The color can range from brown to yellow to gray. By comparison, natural calcium bentonite has a more aesthetically pleasing white color. Consequently, synthetic sodium bentonite that is obtained by treatment of this white calcium bentonite is also white. As a result, natural calcium bentonite and synthetic sodium bentonite find more widespread use in the detergent industry, as compared to natural sodium bentonite. On account of their whiter appearance, calcium or synthetic sodium bentonite would impact/reduce the perceived whiteness of uncolored laundry detergent powder to a lesser extent than natural sodium bentonite.

Applicants' previous studies (see U.S. Pat. No. 8,318,652 to Fernandes et al.) have shown considerable differences in the propensity of certain coloring agents to stain textile substrates depending on the type of bentonite clay (in the form of a colored clay speckle or colored clay powder) to which the coloring agents have been applied (natural sodium vs. natural calcium bentonite; natural sodium bentonite vs. synthetic sodium bentonite; partially vs. fully activated synthetic sodium bentonite). It has been discovered that, at equal color loading, natural sodium bentonite display considerably lower propensity for staining than calcium bentonite. It has also been discovered that, at equal color loading, synthetic sodium bentonite exhibits lesser staining risk than calcium bentonite. However, at equal color loading, even fully activated synthetic sodium bentonite shows greater staining than natural sodium bentonite. The same observations were made independent of whether the color was applied to a bentonite speckle or a bentonite powder.

Applicants' current studies have shown that occult particles can be produced using natural (sodium or calcium) or synthetic/activated bentonites. These studies indicate that occult particles could also be produced from a carrier material that is a blend of natural sodium bentonite with a whiter bentonite (such as calcium bentonite or synthetic sodium bentonite or mixtures thereof), thereby resulting in an occult particle that does not reduce the overall lightness of the white detergent to which it is added (in comparison with an occult particle with made from 100% natural Na-bentonite).

It may be preferable that the carrier material exhibits a particular range of particle size, as determined, for example, by sieving techniques according to ASTM D1921-06 ("Standard Test Method For Particle Size (Sieve Analysis) of Plastic Materials"). Alternative methods known to those skilled in the art may also be utilized for determining particle size. For example, other sieving techniques may be used or electronic laboratory equipment known for determining particle size may alternatively be employed. For the carrier materials of the present invention, it may be preferable that the carrier materials comprise a majority of particles below 0.5 mm in size, or more preferably below 0.25 mm in size.

Thus, in one aspect, the occult particles of the present invention are made of or produced from a powder carrier material that is less than 250 microns in size. Referring to the process for making the occult particle, consider a highly simplified scenario. Any additives or mixtures described in this report (e.g. coloring agent+solvent or coloring agent+solvent+diluent), when mixed with the carrier material will cause agglomeration, resulting in a carrier-coloring agent composite that has a size distribution that is different from the original carrier material if the mixing process is sufficiently mild and energy input low such that no simultaneous size reduction through grinding takes place.

The resulting carrier-coloring agent composite can be separated into various size fractions and the coloring agent loading on each fraction can be determined. As Experiments 1 through 15 will show, the distribution of the coloring agent on the various size fractions is dependent on the nature of the coloring agent, the amount and nature of the solvent and/or diluent, the dilution of the coloring agent prior to addition to the carrier material, and/or the order of addition of the coloring agent and diluent to the carrier material. Carrier-coloring agent composites that have lower amounts of coloring agent on their less than 90 micron size fractions are visually less colored.

Carrier-coloring agent composites prepared using Samples 4F and 5E, for example, look uncolored because >90% of the coloring agent is contained in the greater than 90 micron size fraction which comprise <50% of the total weight of the carrier-coloring agent composite or, to be more precise, >80% of the coloring agent is contained in the greater than 250 micron size fraction which comprises ~12-25% of the total carrier-coloring agent composite. The greater than 90 micron size fractions can be re-ground and added back into the mixture to achieve a final size distribution optimized for producing occult particles with reasonable bleed resistance. It is understood that the re-grinding will alter the amounts of coloring agent present in the various size fractions.

The description and examples above are not to be considered limiting. The description of the process, for example, is highly simplified so as provide clear representation of a key mechanism by which occult particles may be produced. One can easily imagine a slightly more complicated process wherein agglomeration and size reduction (grinding/milling) occur simultaneously or even more intricate or complicated processes which no doubt occur during full-scale production. The exact size fraction or fractions that may be chosen for grinding, milling or regrinding may be different. As best understood, the basic concepts illustrated by the simplified description provided above and subsequent elaboration in the rest of this application are applicable and remain important to successful production of occult particles regardless of the complexity of the production process.

Coloring Agent

The coloring agent of the present invention is preferably a polymeric colorant. The term "polymeric colorant" generally refers to a colorant having at least one chromophore portion attached to at least one oligomeric or polymeric chain, wherein the chain has at least three repeating units. The oligomeric or polymeric constituent can be bound to the chromophore via any suitable means, such as a covalent bond, an ionic bond, or suitable electrostatic interaction. Generally, the polymeric colorant may be characterized by having an absorbance in the range of between about 300 nanometers and about 900 nanometers, as measured by UV-vis spectroscopy.

As a function of its manufacturing process, the polymeric colorant has a molecular weight that is typically represented as a molecular weight distribution. Accordingly, the molecular weight of the polymeric colorant is generally reported as an average molecular weight, as determined by its molecular weight distribution.

The chromophore group of the colorant may vary widely, and may include compounds characterized in the art as dyestuffs or as pigments. The actual group used will depend to a large extent upon, for instance, the desired color and colorfastness characteristics. The chromophore group may be attached to at least one polyalkyleneoxy-substituent through a suitable linking moiety of nitrogen, oxygen, sulfur, etc.

In one aspect, the chromophore group may be a neutral or an uncharged molecule. In a further aspect, the chromophore group may be nonionic, anionic, or cationic. The coloring agent may contain a chromophore that has both positive and negative charges. Further, the coloring agent may contain a chromophore that is zwitterionic or amphoteric.

Examples of chromophore groups include nitroso, nitro, azo (including monoazo, diazo, bis-azo, disazo, trisazo, tetrakisazo, polyazo, formazan, azomethine and metal complexes thereof), stilbene, bis-stilbene, biphenyl, oligophenethylene, fluorene, coumarin, napthalamide, diarylmethane, triarylmethane, xanthene acridine, quinoline, methine (including polymethine), thiazole, indamine, indophenol, azine, thiazine, oxazine, aminoketone, hydroxyketone, anthraquinone (including anthrapyrazolines, anthrone, anthrapyridone, anthrapyrimidine, flavanthrone, pyranthrone, benzanthrone, perylene, perinone, naphthalimide and other structures formally related to anthraquinone), indigoid (including thioindigoid), phthalocyanine chromophore groups, and mixtures thereof.

Examples of suitable polymeric chains are polyalkyleneoxy chains. The term "polyalkyleneoxy," as used herein, generally refers to molecular structures containing the following repeating units: —$CH_2CH_2O$—, $CH_2CH_2CH_2O$—, —$CH_2CH_2CH_2CH_2O$—, —$CH_2CH(CH_3)O$—, —$CH_2CH(CH_2CH_3)O$— $CH_2CH_2CH(CH_3)O$—, $CH_2CH(O$—) ($CH_2O$—), and any combinations thereof.

Typical of such groups which may be attached to the chromophore group are the polymeric epoxides, such as the polyalkylene oxides and copolymers thereof. Typical polyalkylene oxides and copolymers of same which may be employed to provide the colorants include those made from alkylene oxide monomers containing from two to twenty carbon atoms, or more preferably, from two to six carbon atoms. Examples include: polyethylene oxides; polypropylene oxides; polybutylene oxides; oxetanes; tetrahydrafurans; copolymers of polyethylene oxides, polypropylene oxides and polybutylene oxides; and other copolymers including block copolymers, in which a majority of the polymeric substituent is polyethylene oxide, polypropylene oxide and/or polybutylene oxide. Further, such polyalkyleneoxy group may have an average molecular weight in the range of from about 132 to about 10,000, preferably from about 176 to about 5000.

It is to be understood that because the colorants may or may not be chemically bound to the carrier material, the precise chemical identity of the end group on the polyalkyleneoxy group may not be critical insofar as the proper functioning of the colorant is concerned in the composition. With this consideration in mind, certain most preferred colorants will be defined wherein certain end groups will be identified. Such recitation of end groups is not to be construed as limiting the invention in its broader embodiments in any way. According to such a most preferred embodiment the colorants may be characterized as follows:

$$R\{A[(\text{alkyleneoxy constituent})_n R_1]_m\}_x$$

wherein R is an organic chromophore group, A is a linking moiety in said organic chromophore group selected from the group consisting of N, O, $SO_2$ or $CO_2$, the alkylene moiety of the alkyleneoxy constituent contains from 2 to about 4 carbon atoms, n is an integer of from 2 to about 230, m is 1 when A is O, $SO_2$, $CO_2$ and 1 or 2 when A is N, x is an integer of from 1 to 5, and the product of n times x times m (n.m.x) is from 2 to about 230, and $R_1$ is a member of the group consisting of

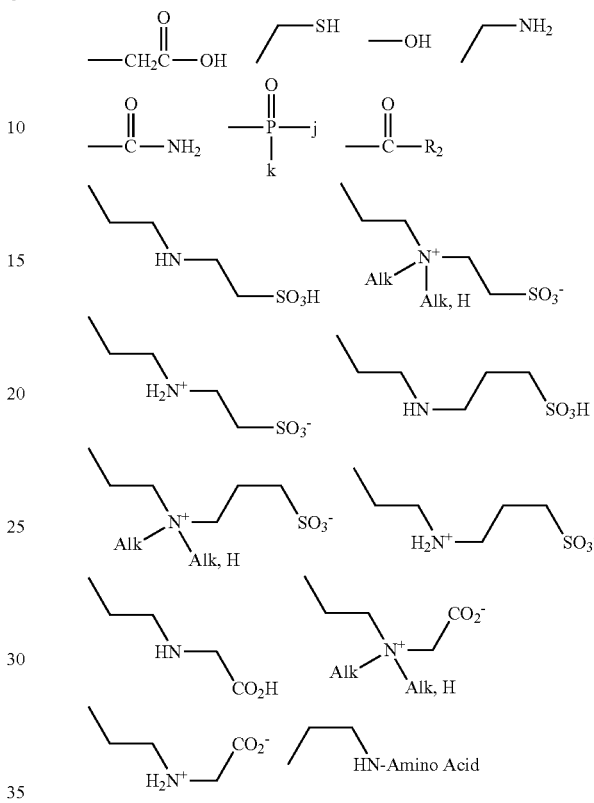

and sulfonates and sulfates of each of the members of said group, wherein $R_2$ is H, an alkyl radical containing up to about 20 carbon atoms or carboxy-terminated alkyl radical containing up to about 20 carbon atoms, j and k are OH, OM or $OR_3$ wherein M is a cation moiety of an alkali metal, an alkaline earth metal, transition metal, e.g., nickel, etc. or ammonium, and $R_3$ is an alkyl radical containing up to about 20 carbon atoms.

The oligomeric constituent can be any suitable constituent including, but not limited to, oligomeric constituents selected from the group consisting of (i) oligomers comprising at least three monomers, or repeating units, selected from the group consisting of $C_2$-$C_{20}$ alkyleneoxy groups, glycidol groups, and glycidyl groups, (ii) aromatic or aliphatic oligomeric esters conforming to structure (I)

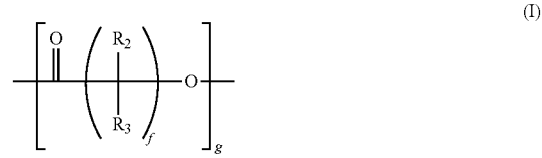

(I)

and (iii) combinations of (i) and (ii). In structure (I), $R_2$ and $R_3$ are independently selected from the group consisting of hydrogen and $C_1$-$C_{10}$ alkyl groups, f is an integer between and including 1 and 10, and g is any positive integer or fraction between and including 1 and 20. As will be understood by those of ordinary skill in the art, suitable values for g include both integers and fractions because the length of the oligomeric constituent on the individual polymeric colorant molecules may vary. Thus, the value for g represents an average length of the ester chain for a given sample or collection of polymeric colorant molecules. In certain embodiments, the polymeric colorant can comprise one or more oligomeric constituents consisting of three or more ethylene oxide monomer groups.

Exemplary polymeric colorants include Liquitint® polymeric colorants, Cleartint® polymeric liquid concentrate colorants, Reactint® polymeric colorants, and Palmer® polymeric colorants, all of which are available from Milliken Chemical, a division of Milliken & Company of Spartanburg, S.C. Liquitint® polymeric colorants are characterized in that they are water soluble, non-staining, colorants. They are widely used in laundry detergents, fabric softeners, and other consumer and industrial cleaning products. Liquitint® polymeric colorants are generally bright liquid colorants which, depending on the specific colorant, exhibit varying degrees of solubility in water. These colorants may also be characterized as being generally compatible with other chemicals present in their end-use formulations and are typically easy to handle. Liquitint® polymeric colorants may be used to provide color in both aqueous and solid systems. The unique polymeric nature of Liquitint® polymeric colorants provides reduced staining to skin, textiles, hard surfaces, equipment, and the like.

Cleartint® polymeric liquid concentrate colorants are specially designed liquid colorants often used for coloring clarified polypropylene articles. These colorants may be incorporated into polypropylene resins easily without detrimentally affecting the clarity of the article to provide transparent, clear and brightly colored polypropylene articles. Cleartint® liquid concentrate polymeric colorants are oligomeric coloring materials which combine the exceptional aesthetics of dyes with the migration resistance of pigments. These colorants may be used as light tints to mask residual haze, or they may be used for deep, rich shades that are not possible with pigment colorants. Cleartint® liquid concentrate polymeric colorants allow clarified polypropylene to rival the beauty of higher cost plastic materials. The technical and physical property benefits of clarified polypropylene may be exploited without sacrificing product aesthetics.

Reactint® polymeric colorants are liquid polymeric colorants useful for coloring polyurethane and other thermoset resins. These colorants are reactive polymeric colorants that consist of chromophores which are chemically bound to polyols. This arrangement allows the polymeric colorant to react into the polyurethane polymer matrix. Unlike pigment pastes, which are dispersions of solid particles in a liquid, Reactint® polymeric colorants are 100% homogeneous liquids that are soluble in polyol and will not settle over time. Because of this pure liquid and easy to disperse nature, it is possible to blend Reactint® colorants in-line and on-the-fly, while producing polyurethane foams and resins.

Palmer® polymer colorants are liquid colorants specially developed for use in washable applications, such as in markers, paints and other art products. They contain no heavy metals, are non-toxic, and have excellent non-staining properties on skin, fabric and other surfaces. Palmer® polymeric colorants have very good compatibility with aqueous ink formulations and provide bright colors.

It is also contemplated to be within the scope of the present invention that other colorants may be utilized as the coloring agent. For example, a colorant selected from one or more of the following classes may be suitable for use as the coloring agent in the colored speckle: acid dyes, basic dyes, direct dyes, solvent dyes, vat dyes, mordant dyes, indigoid dyes, reactive dyes, disperse dyes, sulfur dyes, fluorescent dyes; pigments, both organic and inorganic; natural colorants; and the like. Furthermore, the coloring agent may be comprised of a blend or mixture of a polymeric colorant and a non-polymeric colorant. The polymeric colorant and the non-polymeric colorant may have the same chromophore groups, or they may have different chromophore groups.

Cut Color

There are several elements that need to be controlled in order to successfully produce the occult particles of the present invention. Aspects of the "cut color" made by combining "pure color," with a "solvent/solvent system" for example, can significantly impact successful production of occult particles. Applicants have made two unexpected and non-obvious observations in this regard:

i. A "cut color" containing <25 wt % of a tertiary aromatic amine (e.g. m-toluidine having an average of 5 repeating units of ethylene oxide) is suitable for effective production of the occult particle. In another aspect, a "cut color" containing <15 wt % of a tertiary aromatic amine (e.g. m-toluidine having an average of 5 repeating units of ethylene oxide), or even <10 wt % of a tertiary aromatic amine, or <5 wt % of a tertiary aromatic amine, is suitable for effective production of the occult particle. In yet another aspect, a "cut color" contains from 0 to less than 25 wt % of a tertiary aromatic amine.

ii. The higher the concentration of "pure color" in the "cut color," the more effective the production of the occult particle. In other words, the higher the "color value" or "CV" or "absorbance value," of the "cut color", the more effective the production of the occult particle. Note that the absorbance value (or color value) of a material is the peak absorbance (within the visible spectrum, i.e. 390-700 nm) that a 1 g/L solution of said material would exhibit when placed in a 1 cm path length cuvette.

Consider the following illustrative/non-limiting example: a 0.2% pure color (having a color value or CV of 100) loading of a coloring agent on bentonite powder can be achieved in one of two ways:

Method 1: Cut the pure coloring agent with solvent to achieve a color value of 5 and add 4 g of the cut coloring agent to 96 g of bentonite powder to create the carrier-coloring agent composite, or Method 2: Cut the pure coloring agent with solvent to achieve a color value of 10 and add 2 g of the cut coloring agent to 98 g of bentonite powder to create the carrier-coloring agent composite.

Both Method 1 and 2 result in bentonite powder with the same number of pure color molecules per unit weight of carrier material. However, Method 2 will produce a carrier-coloring agent composite that is visually less colored than the carrier-coloring agent composite of Method 1.

A suitable solvent or solvent system dissolves enough pure color to produce a solution or "cut color" having at least 0.5 wt % of pure color and includes mixtures of solvents. Examples of suitable solvents include, but are not limited to, diols (such as ethylene glycol, propylene glycol, dipropylene glycol, and the like), triols, ethers, esters (such as propylene carbonate), polyethers (such as polyethylene glycol, e.g. PEG 200; polypropylene glycol; and the like), polyols (such as monomeric, polymeric polyols, polyether polyols, and polyester polyols), glycol ethers (such as dipropylene glycol n-propyl ether, dipropylene glycol n-butyl ether, dipropylene glycol dimethyl ether, and the like), cyclic ureas (such as 1,3-dimethyl-2-imidazolidinone, 1,3-dimethyl-3,4,5,6-tetrahydro-2 (1H)-pyrimidinone etc.), lactams (such as N-methyl-2-pyrrolidone and other dipolar non-hydrogen bond donors), fatty acids (such as oleic acid and the like), polyesters, polycarbonates, polyaspartics, amides, hydrocarbons, water, aqueous solutions, halogenated solvents, triglycerides (such as vegetable oil) and amines (with the exception of tertiary aromatic amines) and mixtures thereof.

It is understood that the final choice of CV for the cut color will be a function of a variety of factors such as long term stability of cut color, ease of handling (e.g. viscosity etc.) and other requirements.

Diluent

The addition of at least one diluent to the cut color prior to application onto the carrier material can significantly aid the production of occult particles.

Thus, in one aspect, a 0.2% pure color (having a color value or CV of 100) loading of a coloring agent on bentonite powder can be achieved in one of two ways:

Method 1: Cut the pure coloring agent with solvent to achieve color value of 5 (cut color) and add 4 g of the cut color to 96 g of bentonite powder to create the carrier-coloring agent composite, or Method 2: Cut the pure coloring agent with solvent to achieve a color value of 5 (cut color) as in Method 1. Subsequently add to this 5 color value cut material a diluent to produce a 2.5 CV mixture (cut color and diluent mixed in 1:1 ratio). Add 8 g of the mixture to 92 g of bentonite powder to create the carrier-coloring agent composite.

If the same processing steps are followed for Methods 1 and 2, then a relative parameter that quantifies the effectiveness of diluents at facilitating production of occult particles can be formulated as "R." R=(wt % total coloring agent in >90 micron fractions for Method 2)/(wt % total coloring agent in >90 micron fractions for Method 1). Note 1: this parameter is valid only if the same "cut color" with the same CV is used to produce the carrier-coloring agent composites in methods 1 and 2. Note 2: the "cut color" is not constrained to have CV=5. The definition of R holds for any CV of the "cut color" so long as Note 1 is satisfied.

In this regard, Applicants have observed the following:

Suitable diluents are molecules of mixtures of molecules for which R>1 when mixed with cut color in a 1:1 ratio. This does not imply that diluents can only be added to cut color in a 1:1 ratio. Specific examples of suitable diluents include water, aqueous solutions and/or dispersions, water soluble substances like glycerol, propylene carbonate, ethylene glycol, and the like, and mixtures thereof. Suitable lipophilic diluents are substances displaying an octanol-water partition coefficient value (i.e. log Kow) >3. Non-limiting examples include vegetable oils, essential oils, fatty acids, mineral oils, paraffin's, hydrocarbons, and the like and mixtures thereof.

Additional Additives

The coloring agent plus solvent plus diluent mixture may additionally contain one or more of the following: inorganic or organic salts, surfactants, hydrotopes, rheology modifiers, surface tension modifiers, wetting agents, film formers and plasticizers. For example, adding potassium chloride to water can alter the distribution of coloring agent on the various size fractions of the carrier-coloring agent composite. Also, salts can induce aggregation of dyes, and influence solution phase behavior of polymeric colorants. Emulsifying agents may also be included as an optional additive.

Inclusion of film formers can inhibit bleeding. The bleed inhibitory performance of film formers may be enhanced or improved by the inclusion of suitable plasticizers. Cases may arise where the diluent and/or solvent itself may function as a plasticizer for the film former. A non-limiting example would be the use of PEG 200 as a solvent, water a diluent and polyvinyl alcohol as film former, wherein the polyvinyl alcohol is present in a dissolved state in the diluent.

Non-limiting examples of film formers include vinyl alcohol homopolymers (such as polyvinyl alcohol) and copolymers (such as vinyl amine/vinyl alcohol copolymers, vinyl pyrrolidone/vinyl alcohol copolymers, and the like), vinyl acetate homopolymers (such as polyvinyl acetate) and copolymers (such as vinyl acetate/crotonic acid copolymers, vinyl acetate/vinyl laurate copolymers and the like), vinyl pyrrolidone homopolymers (such as polyvinyl pyrrolidone) and copolymers (such as vinyl pyrrolidone/vinyl acetate copolymers, vinyl pyrrolidone/styrene copolymers, vinyl pyrrolidone/n-vinyl caprolactam copolymers), nitrocellulose, cellulose ethers (such as carboxymethyl cellulose, methyl cellulose, hydroxyethylcellulose, hydroxylpropyl cellulose, ethylcellulose, ethyl hydroxyethylcellulose, methyl hydroxyethyl cellulose, hydroxyalkyl methylcellulose and the like), cellulose esters (such as cellulose acetate, cellulose acetate butyrate, cellulose acetate propionate, cellulose acetate phthalate and the like), sulfopolyesters (such as Eastman AQ polymers), proteins (such as gelatin, whey protein, collagen and the like), polysaccharides (such as starch, modified starches, maltodextrin, chitosan, chitosan salts and the like), poly(meth)acrylates, copolymers of methacrylate esters ammoniated, copolymers of ethyl acrylate and methyl methacrylate, poly (methyl methacrylate), acrylics (such as styrene acrylics, e.g. Joncryl resins from BASF), ethylene vinyl acetate copolymers, ethylene vinyl acetate copolymers and mixtures thereof. It is understood that polyvinyl alcohol homopolymers are water soluble resins manufactured by polymerizing vinyl acetate and hydrolyzing the resultant polymer to produce the alcohol. It is also understood that polyvinyl alcohols with different molecular weights and % hydrolysis are available. "X % hydrolysis" means x mole % vinyl alcohol and 100-x mole % vinyl acetate.

Non-limiting examples of plasticizers include polyethylene glycols, polyalkylene glycol, polypropylene glycol, sorbitol, sorbitol acetate, glycerol, glycerol ester, dibutyl sebacate, diethyl phthalate, dioctyl adipate, triethyl citrate, acetyl triethyl citrate, tributyl citrate, tributyl acetyl citrate, monostearylcitrate, soy lecithin, dipropylene glycol dibenzoate, diethylene glycol dibenzoate, dibutyl phthalate, benzyl butyl phthalate, ethylene carbonate, triacetin, ethylene glycols and derivatives, propylene glycols and derivatives, polyhydric alcohols, lactone modified polyvinyl alcohol, polyols, triethanolamine, diethylene glycol, dipropylene glycol, succinate polyesters, polyesters of polyethylene glycol and adipic or succinic acid, starch, polyvinyl alcohol, epoxidized soybean oil, sunflower oil, triethyl citrate, water, oleic acid, citric acid, propylene carbonate, stearic acid, sucrose, vegetable oils, mineral oils, phosphates, fatty acid esters, castor oil, mannitol, and the like, and mixtures thereof.

A hydrotope is a molecule that increases the solubility in water of some molecule that is insufficiently water-soluble.

Non-limiting examples of hydrotopes include salts of xylene sulfonic acid, toluene sulfonic acid and cumene sulfonic acid.

Additional Optional Additives

Additional optional additives that may be included in the occult particles include perfumes, pigments, enzymes, bleach activators, bleaches, bleach catalysts, bleach stabilizers, foam regulators (foam boosters and antifoam agents), fluorescent whitening agents, soil repellents, corrosion inhibitors, soil antiredeposition agents, soil release agents, dye transfer inhibitors, builders, complexing agents, ion exchangers, buffering agents, and mixtures thereof. Bleed inhibitors such as film forming polymers or polymeric coatings may also be included. These additives may be included as one or more additional components comprising the occult particle, in addition to the coloring agent and the clay carrier.

Methods of Forming Occult Particles

As has been previously described, several elements need to be controlled in order to successfully produce occult particles including choice of solvent system and choice of diluent.

The general process steps for making the occult particle of the present invention include the following:
1. Add at least one solvent to the pure "uncut" coloring agent.
2. Mix the at least one solvent with the pure coloring agent. This step is referred to herein as "cutting the pure color" and results in a "cut color."
3. Add at least one diluent to the cut color.
4. Mix the at least one diluent and the cut color.
5. Add the mixture from step #4 to at least one carrier material.
6. Mix the mixture from step #4 and the at least one carrier material. The resulting substance is referred to herein as a "carrier material-cut color composite."
7. Agglomeration, separation of certain size fractions (for either disposal or further processing, such as agglomeration, size reduction/grinding/milling, reintroduction/recycling, and the like), grinding/regrinding, drying and other processing steps (not necessarily in that order/could also be carried out simultaneously) to achieve optimal size distribution for occult effect and bleed stability.

Additives such as salts, surfactants, hydrotopes, rheology modifiers, surface tension modifiers, wetting agents, film formers and plasticizers may be included (as part of the solvent, diluent or both) or may be added in steps 1-4. Additional steps such as application of a barrier coating onto the occult particles may also be included. The temperature at which the various steps are carried out may be controlled so as to deliver or keep components in desired states of matter or to drive off solvents or control moisture levels or water content.

It is understood that Step 4 may also be useful in imparting greater bleed resistance to the occult particles (For details see Experiment 15). It is also understood that the term "carrier material-cut color composite" or "carrier material-coloring agent composite," and similar, refers to the substance that results from step 7 as well.

The general methods for preparing the occult particle described herein may not be construed as limiting the scope of the present invention. There may exist additional methods, by way of alternative processing methods, to combine the carrier material and coloring agent to produce an occult particle that is indiscernible in a non-colored detergent composition, as well as other desired features, as the occult particles produced by the general methods described herein and by their equivalent methods as known to those skilled in the art.

Laundry Care Compositions

The occult particles described in the present specification may be incorporated into a laundry care composition including but not limited to laundry detergents, laundry aids, and fabric care compositions. Such compositions comprise one or more of the occult particles and a laundry care ingredient.

The laundry care compositions including laundry detergents may be in solid or liquid form, including a gel form. The laundry care compositions including laundry detergents may also be in a unit dose pouch. The solid form of the laundry care compositions include, for example, compositions comprised of granules, powder, or flakes. For instance, the occult particles of the present invention may be added to powdered laundry detergent compositions.

The occult particles may be present in a laundry detergent composition in an amount from about 0.0001% to about 20% by weight of the composition, from about 0.0001% to about 10% by weight of the composition, and even from about 0.0001% to about 5% by weight of the composition.

The laundry detergent composition typically comprises a surfactant in an amount sufficient to provide desired cleaning properties. In one embodiment, the laundry detergent composition comprises, by weight, from about 5% to about 90% of the surfactant, and more specifically from about 5% to about 70% of the surfactant, and even more specifically from about 5% to about 40%. The surfactant may comprise anionic, nonionic, cationic, zwitterionic and/or amphoteric surfactants. In a more specific embodiment, the detergent composition comprises anionic surfactant, nonionic surfactant, or mixtures thereof.

Laundry aids include, for example, those as described in "Laundry Detergents," Eduard Smulders, Wiley VCH, 2002, ISBN: 3-527-30520-3.

Fabric care compositions are typically added in the rinse cycle, which is after the detergent solution has been used and replaced with the rinsing solution in typical laundering processes. The fabric care compositions disclosed herein may be comprise a rinse added fabric softening active and one or more occult particles as disclosed in the present specification. The fabric care composition may comprise, based on total fabric care composition weight, from about 1% to about 90%, or from about 5% to about 50% fabric softening active. The occult particles may be present in the fabric care composition in an amount from about 0.5 ppb to about 50 ppm, or from about 0.5 ppm to about 30 ppm.

Suitable Laundry Care Ingredients

While not essential for the purposes of the present invention, the non-limiting list of laundry care ingredients illustrated hereinafter are suitable for use in the laundry care compositions and may be desirably incorporated in certain aspects of the invention, for example to assist or enhance performance, for treatment of the substrate to be cleaned, or to modify the aesthetics of the composition as is the case with perfumes, colorants, dyes or the like. It is understood that such ingredients are in addition to the components that were previously listed for any particular aspect. The total amount of such adjuncts may range, once the amount of dye is taken into consideration from about 90% to about 99.99999995% by weight of the laundry care composition.

The precise nature of these additional components, and levels of incorporation thereof, will depend on the physical form of the composition and the nature of the operation for which it is to be used. Suitable laundry care ingredients include, but are not limited to, fabric softening actives, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the laundry care ingredients are not essential to Applicants' laundry care compositions. Thus, certain embodiments of Applicants' compositions do not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Exemplary anionic surfactants are the alkali metal salts of $C_{10-16}$ alkyl benzene sulfonic acids, preferably $C_{11-14}$ alkyl benzene sulfonic acids. Preferably the alkyl group is linear and such linear alkyl benzene sulfonates are known as "LAS". Alkyl benzene sulfonates, and particularly LAS, are well known in the art. Such surfactants and their preparation are described for example in U.S. Pat. Nos. 2,220,099 and 2,477,383. Especially preferred are the sodium and potassium linear straight chain alkylbenzene sulfonates in which the average number of carbon atoms in the alkyl group is from about 11 to 14. Sodium $C_{11}$-$C_{14}$, e.g., $C_{12}$, LAS is a specific example of such surfactants.

Another exemplary type of anionic surfactant comprises ethoxylated alkyl sulfate surfactants. Such materials, also known as alkyl ether sulfates or alkyl polyethoxylate sulfates, are those which correspond to the formula: R'—O—$(C_2H_4O)_n$—$SO_3M$ wherein R' is a $C_8$-$C_{20}$ alkyl group, n is from about 1 to 20, and M is a salt-forming cation. In a specific embodiment, R' is $C_{10}$-$C_{18}$ alkyl, n is from about 1 to 15, and M is sodium, potassium, ammonium, alkylammonium, or alkanolammonium. In more specific embodiments, R' is $C_{12}$-$C_{16}$, n is from about 1 to 6 and M is sodium.

The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the compositions of this invention and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $ROSO_3$-$M^+$ wherein R is typically a linear $C_8$-$C_{20}$ hydrocarbyl group, which may be straight chain or branched chain, and M is a water-solubilizing cation. In specific embodiments, R is a $C_{10}$-$C_{15}$ alkyl, and M is alkali metal, more specifically R is $C_{12}$-$C_{14}$ and M is sodium.

Specific, non-limiting examples of anionic surfactants useful herein include: a) $C_{11}$-$C_{18}$ alkyl benzene sulfonates (LAS); b) $C_{10}$-$C_{20}$ primary, branched-chain and random alkyl sulfates (AS); c) 010-018 secondary (2,3) alkyl sulfates; d) $C_{10}$-$C_{18}$ alkyl alkoxy sulfates ($AE_xS$) wherein preferably x is from 1-30; e) $C_{10}$-$C_{18}$ alkyl alkoxy carboxylates preferably comprising 1-5 ethoxy units; f) mid-chain branched alkyl sulfates as discussed in U.S. Pat. Nos. 6,020,303 and 6,060,443; g) mid-chain branched alkyl alkoxy sulfates as discussed in U.S. Pat. Nos. 6,008,181 and 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

Suitable nonionic surfactants useful herein can comprise any of the conventional nonionic surfactant types typically used in liquid detergent products. These include alkoxylated fatty alcohols and amine oxide surfactants. Preferred for use in the liquid detergent products herein are those nonionic surfactants which are normally liquid.

Suitable nonionic surfactants for use herein include the alcohol alkoxylate nonionic surfactants. Alcohol alkoxylates are materials which correspond to the general formula: $R^1(C_mH_{2m}O)_nOH$ wherein R' is a $C_8$-$C_{16}$ alkyl group, m is from 2 to 4, and n ranges from about 2 to 12. Preferably $R^1$ is an alkyl group, which may be primary or secondary, that comprises from about 9 to 15 carbon atoms, more preferably from about 10 to 14 carbon atoms. In one embodiment, the alkoxylated fatty alcohols will also be ethoxylated materials that contain from about 2 to 12 ethylene oxide moieties per molecule, more preferably from about 3 to 10 or even from about 7 to 9 ethylene oxide moieties per molecule.

The alkoxylated fatty alcohol materials useful in the liquid detergent compositions herein will frequently have a hydrophilic-lipophilic balance (HLB) which ranges from about 3 to 17. More preferably, the HLB of this material will range from about 6 to 15, most preferably from about 8 to 15. Alkoxylated fatty alcohol nonionic surfactants have been marketed under the trade names Neodol and Dobanol by the Shell Chemical Company.

Another suitable type of nonionic surfactant useful herein comprises the amine oxide surfactants. Amine oxides are materials which are often referred to in the art as "semi-polar" nonionics. Amine oxides have the formula: $R(EO)_x(PO)_y(BO)_zN(O)(CH_2R')_2 \cdot qH_2O$. In this formula, R is a relatively long-chain hydrocarbyl moiety which can be saturated or unsaturated, linear or branched, and can contain from 8 to 20, preferably from 10 to 16 carbon atoms, and is more preferably $C_{12}$-$C_{16}$ primary alkyl. R' is a short-chain moiety, preferably selected from hydrogen, methyl and —$CH_2OH$. When x+y+z is different from 0, EO is ethyleneoxy, PO is propyleneneoxy and BO is butyleneoxy. Amine oxide surfactants are illustrated by $C_{12-14}$ alkyldimethyl amine oxide.

Non-limiting examples of nonionic surfactants include: a) $C_{12}$-$C_{18}$ alkyl ethoxylates, such as, NEODOL® nonionic surfactants from Shell; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) $C_{14}$-$C_{22}$ mid-chain branched alcohols, BA, as discussed in U.S. Pat. No. 6,150,322; e) $C_{14}$-$C_{22}$ mid-chain branched alkyl alkoxylates, $BAE_x$, wherein x if from 1-30, as discussed in U.S. Pat. Nos. 6,153,577, 6,020,303 and 6,093,856; f) Alkylpolysaccharides as discussed in U.S. Pat. No. 4,565,647 to Llenado, issued Jan. 26, 1986; specifically alkylpolyglycosides as discussed in U.S. Pat. Nos. 4,483,780 and 4,483,779; g) Polyhydroxy fatty acid amides as discussed in U.S. Pat. No. 5,332,528, WO 92/06162, WO 93/19146, WO 93/19038, and WO 94/09099; and h) ether capped poly(oxyalkylated) alcohol surfactants as discussed in U.S. Pat. No. 6,482,994 and WO 01/42408.

In the laundry detergent compositions herein, the detersive surfactant component may comprise combinations of anionic and nonionic surfactant materials. When this is the case, the weight ratio of anionic to nonionic will typically range from 10:90 to 90:10, more typically from 30:70 to 70:30. In general compositions with increasing weight ratios favoring nonionic surfactants may lead to increased deposition of the inventive occult particles in a wash. Such factors must always be carefully weighed over against any risk elements that may also increase in these formulations. The ordinarily-skilled artisan is well aware of such factors and formulates accordingly.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006; d) cationic ester surfactants as discussed in U.S. Pat. Nos. 4,228, 042, 4,239,660 4,260,529 and 6,022,844; and e) amino surfactants as discussed in U.S. Pat. No. 6,221,825 and WO 00/47708, specifically amido propyldimethyl amine (APA).

Non-limiting examples of zwitterionic surfactants include derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants; betaine, including alkyl dimethyl betaine and cocodimethyl amidopropyl betaine, $C_8$ to 018 (preferably 012 to 018) amine oxides and sulfo and hydroxy betaines, such as N-alkyl-N,N-dimethylammino-1-propane sulfonate where the alkyl group can be $C_8$ to $C_{18}$, preferably $C_{10}$ to $C_{14}$.

Non-limiting examples of ampholytic surfactants include aliphatic derivatives of secondary or tertiary amines, or aliphatic derivatives of heterocyclic secondary and tertiary amines in which the aliphatic radical can be straight- or branched-chain. One of the aliphatic substituents comprises at least about 8 carbon atoms, typically from about 8 to about 18 carbon atoms, and at least one comprises an anionic water-solubilizing group, e.g. carboxy, sulfonate, sulfate. See U.S. Pat. No. 3,929,678 to Laughlin et al., issued Dec. 30, 1975 at column 19, lines 18-35, for examples of ampholytic surfactants.

As noted, the compositions may be in the form of a solid, either in tablet or particulate form, including, but not limited to particles, flakes, or the like, or the compositions may be in the form of a liquid. The liquid detergent compositions comprise an aqueous, non-surface active liquid carrier. Generally, the amount of the aqueous, non-surface active liquid carrier employed in the compositions herein will be effective to solubilize, suspend or disperse the composition components. For example, the compositions may comprise, by weight, from about 5% to about 90%, more specifically from about 10% to about 70%, and even more specifically from about 20% to about 70% of the aqueous, non-surface active liquid carrier.

The most cost effective type of aqueous, non-surface active liquid carrier is, of course, water itself. Accordingly, the aqueous, non-surface active liquid carrier component will generally be mostly, if not completely, comprised of water. While other types of water-miscible liquids, such alkanols, diols, other polyols, ethers, amines, and the like, have been conventionally been added to liquid detergent compositions as co-solvents or stabilizers, for purposes of the present invention, the utilization of such water-miscible liquids should be minimized to hold down composition cost. Accordingly, the aqueous liquid carrier component of the liquid detergent products herein will generally comprise water present in concentrations ranging from about 5% to about 90%, more preferably from about 20% to about 70%, by weight of the composition.

Detergent compositions may also contain bleaching agents. Suitable bleaching agents include, for example, hydrogen peroxide sources, such as those described in detail in the herein incorporated Kirk Othmer's Encyclopedia of Chemical Technology, 4th Ed (1992, John Wiley & Sons), Vol. 4, pp. 271-300 "Bleaching Agents (Survey)." These hydrogen peroxide sources include the various forms of sodium perborate and sodium percarbonate, including various coated and modified forms of these compounds.

The preferred source of hydrogen peroxide used herein can be any convenient source, including hydrogen peroxide itself. For example, perborate, e.g., sodium perborate (any hydrate but preferably the mono- or tetra-hydrate), sodium carbonate peroxyhydrate or equivalent percarbonate salts, sodium pyrophosphate peroxyhydrate, urea peroxyhydrate, or sodium peroxide can be used herein. Also useful are sources of available oxygen such as persulfate bleach (e.g., OXONE, manufactured by DuPont). Sodium perborate monohydrate and sodium percarbonate are particularly preferred. Mixtures of any convenient hydrogen peroxide sources can also be used.

A suitable percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with a silicate, borate or water-soluble surfactants. Percarbonate is available from various commercial sources such as FMC, Solvay and Tokai Denka.

Compositions of the present invention may also comprise as the bleaching agent a chlorine-type bleaching material. Such agents are well known in the art, and include for example sodium dichloroisocyanurate ("NaDCC"). However, chlorine-type bleaches are less preferred for compositions which comprise enzymes.

(a) Bleach Activators—Preferably, the peroxygen bleach component in the composition is formulated with an activator (peracid precursor). The activator is present at levels of from about 0.01%, preferably from about 0.5%, more preferably from about 1% to about 15%, preferably to about 10%, more preferably to about 8%, by weight of the composition. A bleach activator as used herein is any compound which, when used in conjunction with a hydrogen peroxide, source leads to the in situ production of the peracid corresponding to the bleach activator. Various non-limiting examples of activators are disclosed in U.S. Pat. Nos. 5,576,282; 4,915,854 and 4,412,934. See also U.S. Pat. No. 4,634,551 for other typical bleaches and activators useful herein.

Preferred activators are selected from the group consisting of tetraacetyl ethylene diamine (TAED), benzoylcaprolactam (BzCL), 4-nitrobenzoylcaprolactam, 3-chlorobenzoyl-caprolactam, benzoyloxybenzenesulphonate (BOBS), nonanoyloxybenzenesulphonate (NOBS), phenyl benzoate (PhBz), decanoyloxybenzenesulphonate ($C_{10}$-OBS), benzoylvalerolactam (BZVL), octanoyloxybenzenesulphonate ($C_8$-OBS), perhydrolyzable esters and mixtures thereof, most preferably benzoylcaprolactam and benzoylvalerolactam. Particularly preferred bleach activators in the pH range from about 8 to about 11 are those selected having an OBS or VL leaving group.

Preferred hydrophobic bleach activators include, but are not limited to, nonanoyloxybenzenesulphonate (NOBS); 4-[N-(nonanoyl) amino hexanoyloxy]-benzene sulfonate sodium salt (NACA-OBS), an example of which is described in U.S. Pat. No. 5,523,434; dodecanoyloxybenzenesulphonate (LOBS or $C_{12}$-OBS); 10-undecenoyloxybenzenesulfonate (UDOBS or $C_{11}$-OBS with unsaturation in the 10 position); and decanoyloxybenzoic acid (DOBA).

Preferred bleach activators are those described in U.S. Pat. No. 5,998,350 to Burns et al.; U.S. Pat. No. 5,698,504 to Christie et al.; U.S. Pat. No. 5,695,679 to Christie et al.; U.S. Pat. No. 5,686,401 to Willey et al.; U.S. Pat. No. 5,686,014 to Hartshorn et al.; U.S. Pat. No. 5,405,412 to Willey et al.; U.S. Pat. No. 5,405,413 to Willey et al.; U.S. Pat. No. 5,130,045 to Mitchel et al.; and U.S. Pat. No. 4,412,934 to Chung et al., and copending patent application Ser. No. 08/064,564, all of which are incorporated herein by reference.

The mole ratio of peroxygen source (as AvO) to bleach activator in the present invention generally ranges from at least 1:1, preferably from about 20:1, more preferably from about 10:1 to about 1:1, preferably to about 3:1.

Quaternary substituted bleach activators may also be included. The present laundry compositions preferably comprise a quaternary substituted bleach activator (QSBA) or a quaternary substituted peracid (QSP, preferably a quaternary substituted percarboxylic acid or a quaternary substituted peroxyimidic acid); more preferably, the former. Preferred QSBA structures are further described in U.S. Pat. No. 5,686,015 to Willey et al.; U.S. Pat. No. 5,654,421 to Taylor et al.; U.S. Pat. No. 5,460,747 to Gosselink et al.; U.S. Pat. No. 5,584,888 to Miracle et al.; U.S. Pat. No. 5,578,136 to Taylor et al.; all of which are incorporated herein by reference.

Highly preferred bleach activators useful herein are amide-substituted as described in U.S. Pat. Nos. 5,698,504; 5,695,679; and 5,686,014, each of which are cited herein above. Preferred examples of such bleach activators include: (6-octanamidocaproyl) oxybenzenesulfonate, (6-nonanamidocaproyl)oxybenzenesulfonate, (6-decanamidocaproyl) oxybenzenesulfonate and mixtures thereof.

Other useful activators are disclosed in U.S. Pat. Nos. 5,698,504; 5,695,679; and 5,686,014, each of which is cited herein above, and in U.S. Pat. No. 4,966,723 to Hodge et al. These activators include benzoxazin-type activators, such as a $C_6H_4$ ring to which is fused in the 1,2-positions a moiety —C(O)OC($R^1$)=N—.

Nitriles, such as acetonitriles and/or ammonium nitriles and other quaternary nitrogen containing nitriles, are another class of activators that are useful herein. Non-limiting examples of such nitrile bleach activators are described in U.S. Pat. Nos. 6,133,216; 3,986,972; 6,063,750; 6,017,464; 5,958,289; 5,877,315; 5,741,437; 5,739,327; 5,004,558; and in EP Nos. 790 244, 775 127, 1 017 773, 1 017 776; and in WO 99/14302, WO 99/14296, WO96/40661, all of which are incorporated herein by reference.

Depending on the activator and precise application, good bleaching results can be obtained from bleaching systems having an in-use pH of from about 6 to about 13, and preferably from about 9.0 to about 10.5. Typically, for example, activators with electron-withdrawing moieties are used for near-neutral or sub-neutral pH ranges. Alkalis and buffering agents can be used to secure such pH.

Acyl lactam activators, as described in U.S. Pat. Nos. 5,698,504; 5,695,679 and 5,686,014, each of which is cited herein above, are very useful herein, especially the acyl caprolactams (see for example WO 94-28102 A) and acyl valerolactams (see U.S. Pat. No. 5,503,639 to Willey et al. incorporated herein by reference).

(b) Organic Peroxides, especially Diacyl Peroxides—These are extensively illustrated in Kirk Othmer, Encyclopedia of Chemical Technology, Vol. 17, John Wiley and Sons, 1982 at pages 27-90 and especially at pages 63-72, all incorporated herein by reference. If a diacyl peroxide is used, it will preferably be one which exerts minimal adverse impact on fabric care, including color care.

(c) Metal-Containing Bleach Catalysts—The compositions and methods of the present invention can also optionally include metal-containing bleach catalysts, preferably manganese and cobalt-containing bleach catalysts.

One type of metal-containing bleach catalyst is a catalyst system comprising a transition metal cation of defined bleach catalytic activity (such as copper, iron, titanium, ruthenium tungsten, molybdenum, or manganese cations), an auxiliary metal cation having little or no bleach catalytic activity (such as zinc or aluminum cations), and a sequestrate having defined stability constants for the catalytic and auxiliary metal cations, particularly ethylenediaminetetraacetic acid, ethylenediaminetetra (methylenephosphonic acid) and water-soluble salts thereof. Such catalysts are disclosed in U.S. Pat. No. 4,430,243 to Bragg.

Manganese Metal Complexes—If desired, the compositions herein can be catalyzed by means of a manganese compound. Such compounds and levels of use are well known in the art and include, for example, the manganese-based catalysts disclosed in U.S. Pat. Nos. 5,576,282; 5,246,621; 5,244,594; 5,194,416; and 5,114,606; and European Pat. App. Pub. Nos. 549,271 A1; 549,272 A1; 544,440 A2; and 544,490 A1. Preferred examples of these catalysts include $Mn^{IV}_2(u-O)_3(1,4,7\text{-trimethyl-}1,4,7\text{-triazacyclononane})_2(PF_6)_2$, $Mn^{III}_2(u-O)_1(u-OAc)_2(1,4,7\text{-trimethyl-}1,4,7\text{-triazacyclononane})_2(ClO_4)_2$, $Mn^{IV}_4(u-O)_6(1,4,7\text{-triazacyclononane})_4(ClO_4)_4$, $Mn^{III}Mn^{IV}_4(u-O)_1(u-OAc)_2\text{-}(1,4,7\text{-trimethyl-}1,4,7\text{-triazacyclononane})_2(ClO_4)_3$, $Mn^{IV}(1,4,7\text{-trimethyl-}1,4,7\text{-triazacyclononane})\text{-}(OCH_3)_3(PF_6)$, and mixtures thereof. Other metal-based bleach catalysts include those disclosed in U.S. Pat. Nos. 4,430,243 and 5,114,611. The use of manganese with various complex ligands to enhance bleaching is also reported in the following: U.S. Pat. Nos. 4,728,455; 5,284,944; 5,246,612; 5,256,779; 5,280,117; 5,274,147; 5,153,161; and 5,227,084.

Cobalt Metal Complexes—Cobalt bleach catalysts useful herein are known, and are described, for example, in U.S. Pat. Nos. 5,597,936; 5,595,967; and 5,703,030; and M. L. Tobe, "Base Hydrolysis of Transition-Metal Complexes", *Adv. Inorg. Bioinorg. Mech.*, (1983), 2, pages 1-94. The most preferred cobalt catalyst useful herein are cobalt pentaamine acetate salts having the formula $[Co(NH_3)_5OAc] T_y$, wherein "OAc" represents an acetate moiety and "$T_y$" is an anion, and especially cobalt pentaamine acetate chloride, $[Co(NH_3)_5OAc]Cl_2$; as well as $[Co(NH_3)_5OAc](OAc)_2$; $[Co(NH_3)_5OAc](PF_6)_2$; $[Co(NH_3)_5OAc](SO_4)$; $[Co(NH_3)_5OAc](BF_4)_2$; and $[Co(NH_3)_5OAc](NO_3)_2$ (herein "PAC").

These cobalt catalysts are readily prepared by known procedures, such as taught for example in U.S. Pat. Nos. 6,302,921; 6,287,580; 6,140,294; 5,597,936; 5,595,967; and 5,703,030; in the Tobe article and the references cited therein; and in U.S. Pat. No. 4,810,410; *J. Chem. Ed.* (1989), 66 (12), 1043-45; The Synthesis and Characterization of Inorganic Compounds, W. L. Jolly (Prentice-Hall; 1970), pp. 461-3; *Inorg. Chem.*, 18, 1497-1502 (1979); *Inorg. Chem.*, 21, 2881-2885 (1982); *Inorg. Chem.*, 18, 2023-2025 (1979); Inorg. Synthesis, 173-176 (1960); and *Journal of Physical Chemistry*, 56, 22-25 (1952).

Transition Metal Complexes of Macropolycyclic Rigid Ligands—Compositions herein may also suitably include as bleach catalyst a transition metal complex of a macropolycyclic rigid ligand. The amount used is a catalytically effective amount, suitably about 1 ppb or more, for example up to about 99.9%, more typically about 0.001 ppm or more, preferably from about 0.05 ppm to about 500 ppm (wherein "ppb" denotes parts per billion by weight and "ppm" denotes parts per million by weight).

Transition-metal bleach catalysts of Macrocyclic Rigid Ligands which are suitable for use in the invention compositions can in general include known compounds where they conform with the definition herein, as well as, more preferably, any of a large number of novel compounds expressly designed for the present laundry or laundry uses, and are non-limitingly illustrated by any of the following:

Dichloro-5,12-dimethyl-1,5,8,12-tetraazabicyclo[6.6.2] hexadecane Manganese(II)
Dichloro-5,12-diethyl-1,5,8,12-tetraazabicyclo[6.6.2]hexadecane Manganese(II)
Diaquo-5,12-dimethyl-1,5,8,12-tetraazabicyclo[6.6.2]hexadecaneManganese((II)) Hexafluorophosphate
Diaquo-5,12-diethyl-1,5,8,12-tetraazabicyclo[6.6.2]hexadecaneManganese((II)) Hexafluorophosphate
Aquo-hydroxy-5,12-dimethyl-1,5,8,12-tetraazabicyclo [6.6.2]hexadecane Manganese(III) Hexafluorophosphate
Diaquo-5,12-dimethyl-1,5,8,12-tetraazabicyclo[6.6.2]hexadecaneManganese((II)) Tetrafluoroborate
Dichloro-5,12-dimethyl-1,5,8,12 tetraazabicyclo[6.6.2] hexadecane Manganese(III) Hexafluorophosphate
Dichloro-5,12-diethyl-1,5,8,12-tetraazabicyclo[6.6.2]hexadecaneManganese(III) Hexafluorophosphate
Dichloro-5,12-di-n-butyl-1,5,8,12-tetraaza bicyclo[6.6.2] hexadecane Manganese((II))
Dichloro-5,12-dibenzyl-1,5,8,12-tetraazabicyclo[6.6.2] hexadecaneManganese(II)
Dichloro-5-n-butyl-12-methyl-1,5,8,12-tetraaza-bicyclo [6.6.2]hexadecane Manganese((II))
Dichloro-5-n-octyl-12-methyl-1,5,8,12-tetraaza-bicyclo [6.6.2]hexadecane Manganese((II))
Dichloro-5-n-butyl-12-methyl-1,5,8,12-tetraaza-bicyclo [6.6.2]hexadecane Manganese((II)).

As a practical matter, and not by way of limitation, the compositions and methods herein can be adjusted to provide on the order of at least one part per hundred million of the active bleach catalyst species in the composition comprising a lipophilic fluid and a bleach system, and will preferably provide from about 0.01 ppm to about 25 ppm, more preferably from about 0.05 ppm to about 10 ppm, and most preferably from about 0.1 ppm to about 5 ppm, of the bleach catalyst species in the composition comprising a lipophilic fluid and a bleach system.

(d) Bleach Boosting Compounds—The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness. This is normally accomplished through in situ formation of an active oxygen transfer agent such as a dioxirane, an oxaziridine, or an oxaziridinium. Alternatively, preformed dioxiranes, oxaziridines and oxaziridiniums may be used.

Among suitable bleach boosting compounds for use in accordance with the present invention are cationic imines, zwitterionic imines, anionic imines and/or polyionic imines having a net charge of from about +3 to about −3, and mixtures thereof. These imine bleach boosting compounds of the present invention include those of the general structure:

[I]

where $R^1$-$R^4$ may be a hydrogen or an unsubstituted or substituted radical selected from the group consisting of phenyl, aryl, heterocyclic ring, alkyl and cycloalkyl radicals.

Among preferred bleach boosting compounds are zwitterionic bleach boosters, which are described in U.S. Pat. Nos. 5,576,282 and 5,718,614. Other bleach boosting compounds include cationic bleach boosters described in U.S. Pat. Nos. 5,360,569; 5,442,066; 5,478,357; 5,370,826; 5,482,515; 5,550,256; and WO 95/13351, WO 95/13352, and WO 95/13353.

Peroxygen sources are well-known in the art and the peroxygen source employed in the present invention may comprise any of these well-known sources, including peroxygen compounds as well as compounds, which under consumer use conditions, provide an effective amount of peroxygen in situ. The peroxygen source may include a hydrogen peroxide source, the in situ formation of a peracid anion through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention. The bleach boosting compounds, when present, are preferably employed in conjunction with a peroxygen source in the bleaching systems of the present invention.

(e) Preformed Peracids—Also suitable as bleaching agents are preformed peracids. The preformed peracid compound as used herein is any convenient compound which is stable and which under consumer use conditions provides an effective amount of peracid or peracid anion. The preformed peracid compound may be selected from the group consisting of percarboxylic acids and salts, percarbonic acids and salts, perimidic acids and salts, peroxymonosulfuric acids and salts, and mixtures thereof. Examples of these compounds are described in U.S. Pat. No. 5,576,282 to Miracle et al.

One class of suitable organic peroxycarboxylic acids have the general formula:

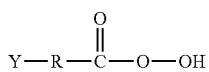

wherein R is an alkylene or substituted alkylene group containing from 1 to about 22 carbon atoms or a phenylene or substituted phenylene group, and Y is hydrogen, halogen, alkyl, aryl, —C(O)OH or —C(O)OOH.

Organic peroxyacids suitable for use in the present invention can contain either one or two peroxy groups and can be either aliphatic or aromatic. When the organic peroxycarboxylic acid is aliphatic, the unsubstituted peracid has the general formula:

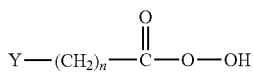

wherein Y can be, for example, H, $CH_3$, $CH_2Cl$, C(O)OH, or C(O)OOH; and n is an integer from 0 to 20. When the organic peroxycarboxylic acid is aromatic, the unsubstituted peracid has the general formula:

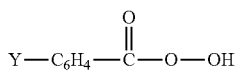

wherein Y can be, for example, hydrogen, alkyl, alkylhalogen, halogen, C(O)OH or C(O)OOH.

Typical monoperoxy acids useful herein include alkyl and aryl peroxyacids such as:
(i) peroxybenzoic acid and ring-substituted peroxybenzoic acid, e.g. peroxy-a-naphthoic acid, monoperoxyphthalic acid (magnesium salt hexahydrate), and o-carboxybenzamidoperoxyhexanoic acid (sodium salt);
(ii) aliphatic, substituted aliphatic and arylalkyl monoperoxy acids, e.g. peroxylauric acid, peroxystearic acid, N-nonanoylaminoperoxycaproic acid (NAPCA), N,N-(3-octylsuccinoyl)aminoperoxycaproic acid (SAPA) and N,N-phthaloylaminoperoxycaproic acid (PAP);
(iii) amidoperoxyacids, e.g. mononoylamide of either peroxysuccinic acid (NAPSA) or of peroxyadipic acid (NAPAA).

Typical diperoxyacids useful herein include alkyl diperoxyacids and aryldiperoxyacids, such as:
(i) 1,12-diperoxydodecanedioic acid;
(ii) 1,9-diperoxyazelaic acid;
(iii) diperoxybrassylic acid; diperoxysebacic acid and diperoxyisophthalic acid;
(iv) 2-decyldiperoxybutane-1,4-dioic acid;
(v) 4,4'-sulfonylbisperoxybenzoic acid.

Such bleaching agents are disclosed in U.S. Pat. No. 4,483,781 to Hartman and 4,634,551 to Burns et al.; European Patent Application 0,133,354 to Banks et al.; and U.S. Pat. No. 4,412,934 to Chung et al. Sources also include 6-nonylamino-6-oxoperoxycaproic acid as described in U.S. Pat. No. 4,634,551 to Burns et al. Persulfate compounds such as for example OXONE, manufactured commercially by E.I. DuPont de Nemours of Wilmington, Del. can also be employed as a suitable source of peroxymonosulfuric acid. PAP is disclosed in, for example, U.S. Pat. Nos. 5,487,818; 5,310,934; 5,246,620; 5,279,757 and 5,132,431.

(f) Photobleaches—Suitable photobleaches for use in the treating compositions of the present invention include, but are not limited to, the photobleaches described in U.S. Pat. Nos. 4,217,105 and 5,916,481.

(g) Enzyme Bleaching—Enzymatic systems may be used as bleaching agents. The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

The present invention compositions and methods may utilize alternative bleach systems such as ozone, chlorine dioxide and the like. Bleaching with ozone may be accomplished by introducing ozone-containing gas having ozone content from about 20 to about 300 $g/m^3$ into the solution that is to contact the fabrics. The gas:liquid ratio in the solution should be maintained from about 1:2.5 to about 1:6. U.S. Pat. No. 5,346,588 describes a process for the utilization of ozone as an alternative to conventional bleach systems and is herein incorporated by reference.

The detergent compositions of the present invention may also include any number of additional optional ingredients. These include conventional laundry detergent composition components such as non-tinting dyes, detersive builders, enzymes, enzyme stabilizers (such as propylene glycol, boric acid and/or borax), suds suppressors, soil suspending agents, soil release agents, other fabric care benefit agents, pH adjusting agents, chelating agents, smectite clays, solvents, hydrotropes and phase stabilizers, structuring agents, dye transfer inhibiting agents, opacifying agents, optical brighteners, perfumes and coloring agents. The various optional detergent composition ingredients, if present in the compositions herein, should be utilized at concentrations conventionally employed to bring about their desired contribution to the composition or the laundering operation. Frequently, the total amount of such optional detergent composition ingredients can range from about 0.01% to about 50%, more preferably from about 0.1% to about 30%, by weight of the composition.

The liquid detergent compositions are in the form of an aqueous solution or uniform dispersion or suspension of surfactant, occult particle, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable and will typically have a viscosity which ranges from about 100 to 600 cps, more preferably from about 150 to 400 cps. For purposes of this invention, viscosity is measured with a Brookfield LVDV-II+ viscometer apparatus using a #21 spindle.

The liquid detergent compositions herein can be prepared by combining the components thereof in any convenient order and by mixing, e.g., agitating, the resulting component combination to form a phase stable liquid detergent composition. In a preferred process for preparing such compositions, a liquid matrix is formed containing at least a major proportion, and preferably substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In an alternate embodiment for forming the liquid detergent compositions, the occult particle is first combined with one or more liquid components to form an occult particle premix, and this occult particle premix is added to a composition formulation containing a substantial portion, for example more than 50% by weight, more specifically, more than 70% by weight, and yet more specifically, more than 90% by weight, of the balance of components of the laundry detergent composition. For example, in the methodology described above, both the occult particle premix and the enzyme component are added at a final stage of component additions. In a further embodiment, the occult particle is encapsulated prior to addition to the detergent composition, the encapsulated occult particle is suspended in a structured liquid, and the suspension is added to a composition formulation containing a substantial portion of the balance of components of the laundry detergent composition.

As noted previously, the detergent compositions may be in a solid form. Suitable solid forms include tablets and particulate forms, for example, granular particles or flakes. Various techniques for forming detergent compositions in such solid forms are well known in the art and may be used herein. In one embodiment, for example when the composition is in the form of a granular particle, the occult particle is provided in particulate form, optionally including additional but not all components of the laundry detergent composition. The occult particle is combined with one or more additional particulates containing a balance of components of the laundry detergent composition. Further, the occult particle, optionally including additional but not all components of the laundry detergent composition, may be provided in an encapsulated form, and the occult particle encapsulate is combined with particulates containing a substantial balance of components of the laundry detergent composition.

The compositions of this invention, prepared as hereinbefore described, can be used to form aqueous washing solutions for use in the laundering of fabrics. Generally, an effective amount of such compositions is added to water, preferably in a conventional fabric laundering automatic washing machine, to form such aqueous laundering solutions. The aqueous washing solution so formed is then contacted, preferably under agitation, with the fabrics to be laundered therewith. An effective amount of the liquid detergent compositions herein added to water to form aqueous laundering solutions can comprise amounts sufficient to form from about 500 to 7,000 ppm of composition in aqueous washing solution. More preferably, from about 1,000 to 3,000 ppm of the detergent compositions herein will be provided in aqueous washing solution.

Fabric Care Compositions/Rinse Added Fabric Softening Compositions

In another specific embodiment, the occult particles of the present invention may be included in a fabric care composition. The fabric care composition may be comprised of at least one occult particle and a rinse added fabric softening composition ("RAFS;" also known as rinse added fabric conditioning compositions). Examples of typical rinse added softening compositions can be found in U.S. Provisional Patent Application Ser. No. 60/687,582 filed on Oct. 8, 2004. The rinse added fabric softening compositions of the present invention may comprise (a) fabric softening active and (b) a thiazolium dye. The rinse added fabric softening composition may comprise from about 1% to about 90% by weight of the FSA, more preferably from about 5% to about 50% by weight of the FSA. The occult particle may be present in the rinse added fabric softening composition in an amount from about 0.5 ppb to about 50 ppm, more preferably from about 0.5 ppm to about 30 ppm.

In one embodiment of the invention, the fabric softening active (hereinafter "FSA") is a quaternary ammonium compound suitable for softening fabric in a rinse step. In one embodiment, the FSA is formed from a reaction product of a fatty acid and an aminoalcohol obtaining mixtures of mono-, di-, and, in one embodiment, triester compounds. In another embodiment, the FSA comprises one or more softener quaternary ammonium compounds such, but not limited to, as a monoalkyquaternary ammonium compound, a diamido quaternary compound and a diester quaternary ammonium compound, or a combination thereof.

In one aspect of the invention, the FSA comprises a diester quaternary ammonium (hereinafter "DQA") compound composition. In certain embodiments of the present invention, the DQA compounds compositions also encompasses a description of diamido FSAs and FSAs with mixed amido and ester linkages as well as the aforementioned diester linkages, all herein referred to as DQA.

A first type of DQA ("DQA (1)") suitable as a FSA in the present CFSC includes a compound comprising the formula:

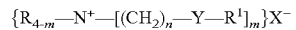

wherein each R substituent is either hydrogen, a short chain $C_1$-$C_6$, preferably $C_1$-$C_3$ alkyl or hydroxyalkyl group, e.g., methyl (most preferred), ethyl, propyl, hydroxyethyl, and the like, poly ($C_{2-3}$ alkoxy), preferably polyethoxy, group, benzyl, or mixtures thereof; each m is 2 or 3; each n is from 1 to about 4, preferably 2; each Y is —O—(O)C—, —C(O)—O—, —NR—C(O)—, or —C(O)—NR— and it is acceptable for each Y to be the same or different; the sum of carbons in each $R^1$, plus one when Y is —O—(O)C— or —NR—C(O)—, is $C_{12}$-$C_{22}$, preferably $C_{14}$-$C_{20}$, with each $R^1$ being a hydrocarbyl, or substituted hydrocarbyl group; it is acceptable for $R^1$ to be unsaturated or saturated and branched or linear and preferably it is linear; it is acceptable for each $R^1$ to be the same or different and preferably these are the same; and $X^-$ can be any softener-compatible anion, preferably, chloride, bromide, methylsulfate, ethylsulfate, sulfate, phosphate, and nitrate, more preferably chloride or methyl sulfate. Preferred DQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyl-oxyethyl)-N,N-methylhydroxyethylammonium methylsulfate wherein the acyl group is derived from animal fats, unsaturated, and polyunsaturated, fatty acids, e.g., tallow, hardened tallow, oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, palm oil, etc.

Non-limiting examples of suitable fatty acids are listed in U.S. Pat. No. 5,759,990 at column 4, lines 45-66. In one embodiment, the FSA comprises other actives in addition to DQA (1) or DQA. In yet another embodiment, the FSA comprises only DQA (1) or DQA and is free or essentially free of any other quaternary ammonium compounds or other actives. In yet another embodiment, the FSA comprises the precursor amine that is used to produce the DQA.

In another aspect of the invention, the FSA comprises a compound, identified as DTTMAC comprising the formula:

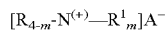

wherein each m is 2 or 3, each $R^1$ is a $C_6$-$C_{22}$, preferably $C_{14}$-$C_{20}$, but no more than one being less than about $C_{12}$ and then the other is at least about 16, hydrocarbyl, or substituted hydrocarbyl substituent, preferably $C_{10}$-$C_{20}$ alkyl or alkenyl (unsaturated alkyl, including polyunsaturated alkyl, also referred to sometimes as "alkylene"), most preferably $C_{12}$-$C_{18}$ alkyl or alkenyl, and branch or unbranched. In one embodiment, the Iodine Value (IV) of the FSA is from about 1 to 70; each R is H or a short chain $C_1$-$C_6$, preferably $C_1$-$C_3$ alkyl or hydroxyalkyl group, e.g., methyl (most preferred), ethyl, propyl, hydroxyethyl, and the like, benzyl, or ($R^2$O)$_{2-4}$H where each $R^2$ is a $C_{1-6}$ alkylene group; and $A^-$ is a softener compatible anion, preferably, chloride, bromide, methylsulfate, ethylsulfate, sulfate, phosphate, or nitrate; more preferably chloride or methyl sulfate.

Examples of these FSAs include dialkydimethylammonium salts and dialkylenedimethylammonium salts such as ditallowdimethylammonium and ditallowdimethylammonium methylsulfate. Examples of commercially available dialkylenedimethylammonium salts usable in the present invention are di-hydrogenated tallow dimethyl ammonium chloride and ditallowdimethyl ammonium chloride available from Degussa under the trade names Adogen® 442 and Adogen® 470 respectively. In one embodiment, the FSA comprises other actives in addition to DTTMAC. In yet another embodiment, the FSA comprises only compounds of the DTTMAC and is free or essentially free of any other quaternary ammonium compounds or other actives.

In one embodiment, the FSA comprises an FSA described in U.S. Pat. Pub. No. 2004/0204337 A1, published Oct. 14, 2004 to Corona et al., from paragraphs 30-79. In another embodiment, the FSA is one described in U.S. Pat. Pub. No. 2004/0229769 A1, published Nov. 18, 2005, to Smith et al., on paragraphs 26-31; or U.S. Pat. No. 6,494,920, at column 1, line 51 et seq. detailing an "esterquat" or a quaternized fatty acid triethanolamine ester salt.

In one embodiment, the FSA is chosen from at least one of the following: ditallowoyloxyethyl dimethyl ammonium chloride, dihydrogenated-tallowoyloxyethyl dimethyl ammonium chloride, ditallow dimethyl ammonium chloride, ditallowoyloxyethyl dimethyl ammonium methyl sulfate, dihydrogenated-tallowoyloxyethyl dimethyl ammonium chloride, dihydrogenated-tallowoyloxyethyl dimethyl ammonium chloride, or combinations thereof.

In one embodiment, the FSA may also include amide containing compound compositions. Examples of diamide comprising compounds may include but not limited to methyl-bis(tallowam idoethyl)-2-hydroxyethylammonium methyl sulfate (available from Degussa under the trade names Varisoft 110 and Varisoft 222). An example of an amide-ester containing compound is N-[3-(stearoylamino) propyl]-N-[2-(stearoyloxy)ethoxy)ethyl)]-N-methylamine.

Another specific embodiment of the invention provides for a rinse added fabric softening composition further comprising a cationic starch. Cationic starches are disclosed in US 2004/0204337 A1. In one embodiment, the rinse added fabric softening composition comprises from about 0.1% to about 7% of cationic starch by weight of the fabric softening composition. In one embodiment, the cationic starch is HCP401 from National Starch.

Suitable Laundry Care Ingredients

While not essential for the purposes of the present invention, the non-limiting list of laundry care ingredients illustrated hereinafter are suitable for use in the laundry care compositions and may be desirably incorporated in certain embodiments of the invention, for example to assist or enhance performance, for treatment of the substrate to be cleaned, or to modify the aesthetics of the composition as is the case with perfumes, colorants, dyes or the like. For example, to obtain other aesthetic colors in a detergent, the present dyes may be mixed with additional dyes or colorants, such as with a blue triphenylmethane dye. It is understood that such ingredients are in addition to the components that were previously listed for any particular embodiment. The total amount of such adjuncts may range from about 0.1% to about 50%, or even from about 1% to about 30%, by weight of the laundry care composition.

The precise nature of these additional components, and levels of incorporation thereof, will depend on the physical form of the composition and the nature of the operation for which it is to be used. Suitable laundry care ingredients include, but are not limited to, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the laundry care ingredients are not essential to Applicants' laundry care compositions. Thus, certain embodiments of Applicants' compositions do not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Surfactants—The compositions according to the present invention can comprise a surfactant or surfactant system wherein the surfactant can be selected from nonionic and/or anionic and/or cationic surfactants and/or ampholytic and/or zwitterionic and/or semi-polar nonionic surfactants. The surfactant is typically present at a level of from about 0.1%, from about 1%, or even from about 5% by weight of the cleaning compositions to about 99.9%, to about 80%, to about 35%, or even to about 30% by weight of the cleaning compositions.

Builders—The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds. ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Catalytic Metal Complexes —Applicants' compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methyl-enephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936 and 5,595,967. Such cobalt catalysts are readily prepared by known procedures, such as taught for example in U.S. Pat. Nos. 5,597,936, and 5,595,967.

Compositions herein may also suitably include a transition metal complex of a macropolycyclic rigid ligand—abbreviated as "MRL". As a practical matter, and not by way of limitation, the compositions and cleaning processes herein can be adjusted to provide on the order of at least one part per hundred million of the benefit agent MRL species in the aqueous washing medium, and may provide from about 0.005 ppm to about 25 ppm, from about 0.05 ppm to about 10 ppm, or even from about 0.1 ppm to about 5 ppm, of the MRL in the wash liquor.

Preferred transition-metals in the instant transition-metal bleach catalyst include manganese, iron and chromium. Preferred MRL's herein are a special type of ultra-rigid ligand that is cross-bridged such as 5,12-diethyl-1,5,8,12-tetraazabicyclo[6.6.2]hexa-decane.

Suitable transition metal MRLs are readily prepared by known procedures, such as taught for example in WO 00/32601, and U.S. Pat. No. 6,225,464.

Method of Use

Certain of the consumer products disclosed herein can be used to clean or treat a situs inter alia a surface or fabric. Typically at least a portion of the situs is contacted with an embodiment of Applicants' consumer product, in neat form or diluted in a liquor, for example, a wash liquor and then the situs may be optionally washed and/or rinsed. In one aspect, a situs is optionally washed and/or rinsed, contacted with an aspect of the consumer product and then optionally washed and/or rinsed. For purposes of the present invention, washing includes but is not limited to, scrubbing, and mechanical agitation. The fabric may comprise most any fabric capable of being laundered or treated in normal consumer use conditions. Liquors that may comprise the disclosed compositions may have a pH of from about 3 to about 11.5. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Employing one or more of the aforementioned methods results in a treated situs.

EXAMPLES

The invention may be further understood by reference to the following examples which are not to be construed as limiting the scope of the present invention.

The following examples were prepared to illustrate that, at equal color loadings and particle size, occult particles prepared according to the methods of the present invention are indiscernible in a non-colored (e.g. white) detergent composition. Furthermore, the occult particles provide a desirable whitening effect to textile substrates treated therewith, yet they do not stain the treated textile substrates. Also, the occult particles of the present invention do not bleed into the surrounding granular detergent composition.

Experiment 1

1. This experiment was performed using a single sample/batch of Liquitint® Violet DD polymeric colorant (available from Milliken & Company of Spartanburg, S.C.) cut with the solvent polyethylene glycol 200 ("PEG 200") to a color value ("CV") of approximately 4.5. UV/Vis spectrophotometer analysis showed that this 4.5 CV material contained at most about 1.75 wt % m-toluidine ethoxylate having an average distribution of 5 ethylene oxide repeating units ("MtoI5EO"). Liquitint® Violet DD contains an uncharged (i.e. nonionic or neutral) azo chromophore group.

2. The carrier material used was 200 mesh Natural Sodium Bentonite (46E 0438, Clay Spur, Wyo. USA, WARD470025-428, VWR: 470025-428).

3. Four separate mixtures, each containing 2 g of the CV 4.5 Violet DD/PEG material described in 1 and 2 g of a) PEG 200 (Sample 1A), b) An5EO:aniline ethoxylate having an average distribution of 5 ethylene oxide repeating groups (Sample 1B), c) MtoI5EO (Sample 1C) and d) aniline PEG10 (Sample 1 D) were prepared.

4. Each of the mixtures described in 3 was added to 50 g of the bentonite powder described in 2 and mixed using a food processor.

5. 2 g of deionized ("DI") water was added to the mix in 4 using the food processor.

6. The resulting samples were allowed to dry in aluminum pans at room temperature overnight and then visually evaluated for intensity of color.

Results: Samples 1B and 1C produced much more intensely colored carrier-coloring agent composite than Samples 1A and 1 D. This result supports the theory that tertiary aromatic amine solvents (An5EO and MtoI5EO) are detrimental to hiding of the coloring agent on the clay carrier. Sample 1D supports the theory that primary aromatic amine solvents are not as detrimental to hiding the coloring agent on the clay carrier (AnPEG10 is a primary aromatic amine solvent).

Experiment 2

1. This experiment was performed using three batches of Liquitint® Violet DD polymeric colorant:
Batch A: contains Liquitint® Violet DD (CV ~4.5). This material contained at most 1.75 wt % MtoI5EO (UV/Vis analysis) with the remainder of the solvent being PEG 200.
Batch B: contains Liquitint® Violet DD (CV ~4.5). This material contained 40 wt % MtoI5EO (UV/Vis analysis) with the remainder of the solvent being PEG 200.
Batch C: contains Liquitint® Violet DD (CV ~8.7). This material contained at most 1.75 wt % MtoI5O (UV/Vis analysis) with the remainder of the solvent being PEG 200.

2. The carrier material used was Natural Sodium Bentonite (AMCOL: 18061001).

3. Six separate mixtures were prepared:
a) 2 g of Batch A Violet DD described in 1+2 g DI Water (Sample 2A),
b) 2 g of Batch A Violet DD described in 1+0.15 g MtoI5EO+2 g DI Water (Sample 2B),
c) 2 g of Batch A Violet DD described in 1+0.265 g MtoI5EO+2 g DI Water (Sample 2C),
d) 2 g of Batch A Violet DD described in 1+0.5 g MtoI5EO+2 g DI Water (Sample 2D) and
e) 2 g of Batch B Violet DD described in 1+2 g DI Water (Sample 2E)
f) 1.1 g of Batch C Violet DD described in 1 (Sample 2F)

4. Each of the mixtures described in 3 was added to 50 g of the bentonite powder described in 2 and mixed using a food processor.

5. The resulting samples were allowed to dry in aluminum pans at room temperature overnight and then visually evaluated for intensity of color.

Results: Samples 2A, 2B, 2C and 2D produced carrier-coloring agent composites that progressively exhibited more visual coloration from A through D. The carrier-coloring agent composites prepared with Samples 2A, 2B, 2C and 2D were all lighter in color than the carrier-coloring agent composite prepared with Sample 2F. The carrier-coloring agent composite prepared with Sample 2F was in turn lighter than the one produced with Sample 2E. The carrier-coloring agent composite prepared with Sample 2E exhibited, by far, the most visual coloration. This result supports the theory that the presence of >25 wt % of a tertiary aromatic amine solvent is detrimental to hiding of the coloring agent on the clay carrier.

Note 1: Sample 2D contained approximately 22 wt % MtoI5EO. (Represents estimated MtoI5EO % in Violet DD+MtoI5EO mixture without water).

Note 2: The carrier-coloring agent composite prepared with Sample 2F represented a borderline case of a colored clay that can produce a relatively uncolored white powdered detergent (or that can successfully hide Violet DD: details in Note 3). Consequently, the carrier-coloring agent composite prepared with Sample 2E (40 wt % MtoI5EO) represents a failure to hide Violet DD in the white detergent. The carrier-coloring agent composites prepared with Samples 2A, 2B, 2C and 2D (containing 1.75 wt %, 9 wt %, 13 wt % and 22 wt % MtoI5EO, respectively) are representative of the occult particles of the present invention as they successfully hide the coloring agent on/within the carrier material when the occult particle is visually observed in a non-colored (i.e. white) detergent composition.

Note 3: The carrier-coloring agent composite prepared with Sample 2F was next incorporated into AATCC 1993

Standard Reference Detergent without Brightener detergent composition at 0.6 wt % and mixed well. Visual assessment of this mixture against a reference of AATCC detergent only showed no obvious color perception on the detergent. The mix of the carrier-coloring agent composite prepared with Sample 2F in the detergent did make the detergent look whiter and exhibited a dE*cmc=2.8 (The carrier-coloring agent composite prepared with Sample 2F+AATCC vs ref AATCC only).

Thus, the term "substantially indiscernible" as used herein generally refers to a detergent composition containing a carrier-coloring agent composite of the present invention and having a dE*cmc≤3.0, or even a dE*cmc≤2.5, or even a dE*cmc≤2.0, when compared to the detergent composition containing only the carrier material (no coloring agent).

It is understood that spectrophotometric (reflectance) measurements on powders or granules are subject to many sources of variability. One such source of variability is how the granules or powders pack in the measuring container or cuvette. The values quoted above are to be taken as guidelines and not strict limits. Also, the color of the detergent substrate can impact the dE*cmc limit as it pertains to what the human eye perceives as a difference.

Experiment 3

1. This experiment was performed using two batches of Liquitint® Violet DD polymeric colorant:
Batch A: contained Liquitint® Violet DD (CV ~4.5). This material contained at most 1.75 wt % MtoI5EO (UV/Vis analysis) with the remainder of the solvent being PEG 200.
Batch B: contained Liquitint® Violet DD (CV ~8.7). This material contained at most 1.75 wt % MtoI5EO (UV/Vis analysis) with the remainder of the solvent being PEG 200.
2. The carrier material used was Natural Sodium Bentonite (AMCOL: 18061001).
3. Three separate mixtures were prepared:
a) 1.1 g of Batch B Violet DD described in 1 (Sample 3A)
b) 2 g of Batch A Violet DD described in 1 (Sample 3B),
c) 2 g of Batch A Violet DD described in 1+2 g PEG 200 (Sample 3C).
4. Each of the mixtures described in 3 was added to 50 g of the bentonite powder described in 2 and mixed using a food processor.
5. The resulting samples were allowed to dry in aluminum pans at room temperature overnight and then visually evaluated for intensity of color.

Results: The carrier-coloring agent composite prepared with Sample 3A was noticeably lighter than the carrier-coloring agent composite prepared with Sample 3B. The carrier-coloring agent composite prepared with Sample 3B was in turn noticeably lighter than the carrier-coloring agent composite prepared with Sample 3C. Note that the final concentration of color on the clay carrier was the same in all three cases. By limiting the amount of solvent (PEG 200 in this specific case), the coloring agent was better hidden on/within the clay carrier.

This experiment supports the theory that the higher the concentration of pure color in the cut color (or the higher the CV), the more effective is the hiding of the occult particle in the detergent composition. It is believed the reason for this effect is that as the amount of PEG 200 is increased (CV is decreased), more color spreads onto the lower particle size fractions (<90 micron) of the clay powder, consequently producing more colored powders.

Note: The distribution of color on the various size fractions of the clay is determined through sieve analysis followed by color extraction. Thus, in the carrier-coloring agent composite prepared with Sample 3A, approximately 33% of Violet DD ends up on the <90 micron clay fractions. This is compared to approximately 49% for the carrier-coloring agent composite prepared with Sample 3B and about 54% for the carrier-coloring agent composite prepared with Sample 3C.

Experiment 4

1. This experiment was performed using a single sample/batch of Liquitint® Violet DD polymeric colorant cut with the solvent PEG 200 to a CV of approximately 4.5. UV/Vis spectrophotometer analysis showed that this 4.5 CV material contained at most about 1.75 wt % MtoI5EO.
2. The carrier material used was 200 mesh Natural Sodium Bentonite (46E 0438, Clay Spur, Wyo. USA, WARD470025-428, VWR: 470025-428).
3. Six separate mixtures were prepared:
a) 2 g of Violet DD described in 1 (Sample 4A)
b) 2 g of Violet DD described in 1+2 g PEG 200 (Sample 4B)
c) 2 g of Violet DD described in 1+2 g Ethylene Glycol (Sample 4C)
d) 2 g of Violet DD described in 1+2 g Ethoquad® O12/PG (PEG-2 Oleamonium Chloride) (Sample 4D)
e) 2 g of Violet DD described in 1+2 g Glycerol (Sample 4E)
f) 2 g of Violet DD described in 1+2 g Propylene Carbonate (Sample 4F)
4. Each of the mixtures described in 3 was added to 50 g of the bentonite powder described in 2 and mixed using a food processor.
5. 2 g of DI Water was added to the mix in 4 using the food processor.
6. The resulting samples were allowed to dry in aluminum pans at room temperature overnight and then visually evaluated for intensity of color.

Results: The carrier-coloring agent composites prepared with Samples 4C through 4F were noticeably lighter in color than the carrier-coloring agent composite prepared with Sample 4A. The carrier-coloring agent composite prepared with Sample 4A was in turn noticeably lighter in color than the carrier-coloring agent composite prepared with Sample 4B. It is believed the reason for this effect is that when used as diluents, Ethylene Glycol, Ethoquad® O12/PG, Glycerol and Propylene Glycol reduce the ability of the color to spread onto the lower particle size fractions (<90 micron) of the clay carrier. In contrast, when PEG 200 is used as a diluent, colorant-containing particles that include PEG 200 result in more color spreading onto the lower particle size fractions (<90 micron) of the clay carrier.

Note: The distribution of color on the various size fractions of the clay is determined through sieve analysis followed by color extraction. Results are shown in Table 1 below.

TABLE 1

Various Diluents and Their Effect on Color Value in Less
Than 90 Micron-Sized Carrier Material Particles

| Diluent | Wt % Total Color in <90 Micron Fractions | R Value |
|---|---|---|
| Sample 4A | 46.1% | N/A |
| Sample 4B | 52.4% | 0.88 |
| Sample 4C | 41.9% | 1.08 |
| Sample 4D | 17.3% | 1.53 |
| Sample 4E | 10.6% | 1.66 |
| Sample 4F | 4.4% | 1.77 |

"N/A" means not applicable.

Experiment 5

1. This experiment was performed using a single sample/batch of Liquitint® Violet DD polymeric colorant cut with the solvent PEG 200 to a CV of approximately 4.5. UV/Vis spectrophotometer analysis showed that this 4.5 CV material contained at most ~1.75 wt % MtoI5EO.
2. The carrier material used was Natural Sodium Bentonite (AMCOL: 18061001).
3. Five separate mixtures were prepared:
a) 2 g of Violet DD described in 1 (Sample 5A)
b) 2 g of Violet DD described in 1+2 g PEG 200 (Sample 5B)
c) 2 g of Violet DD described in 1+2 g Ethoquad® 012/PG (Sample 5C)
d) 2 g of Violet DD described in 1+2 g Glycerol (Sample 5D)
e) 2 g of Violet DD described in 1+2 g DI Water (Sample 5E)
4. Each of the mixtures described in 3 was added to 50 g of the bentonite powder described in 2 and mixed using a food processor.
5. The resulting samples were allowed to dry in aluminum pans at room temperature overnight and then visually evaluated for intensity of color.

Results: The carrier-coloring agent composites prepared with Samples 5C through 5E were noticeably lighter in coloration than the carrier-coloring agent composite prepared with Sample 5A. The carrier-coloring agent composite prepared with Sample 5A was in turn noticeably lighter in coloration than the carrier-coloring agent composite prepared with Sample 5B. It is believed that the reason for this effect is that when used as diluents, Ethoquad® 012/PG, Glycerol and DI Water reduce the ability of the color to spread onto the lower particle size fractions (<90 micron) of the clay carrier. In contrast, when PEG 200 is used as a diluent, colorant-containing particles that include PEG 200 result in more color spreading onto the lower particle size fractions (<90 micron) of the clay carrier.

Note: The distribution of color on the various size fractions of the clay is determined through sieve analysis followed by color extraction. Results are shown in Table 2 below.

TABLE 2

Various Diluents and Their Effect on Color Value in Less
Than 90 Micron-Sized Carrier Material Particles

| Diluent | Wt % Total Color in <90 Micron Fractions | R Value |
|---|---|---|
| Sample 5A | 48.7% | N/A |
| Sample 5B | 53.7% | 0.9 |
| Sample 5C | 12.3% | 1.71 |

TABLE 2-continued

Various Diluents and Their Effect on Color Value in Less
Than 90 Micron-Sized Carrier Material Particles

| Diluent | Wt % Total Color in <90 Micron Fractions | R Value |
|---|---|---|
| Sample 5D | 8.1% | 1.79 |
| Sample 5E | 4.3% | 1.87 |

"N/A" means not applicable.

The results from Experiments 4 and 5 support the theory that diluents for which R>1 may be used to significantly reduce the appearance of color on the carrier-coloring agent composite. Specific examples of suitable diluents include water, glycerol, propylene carbonate, ethylene glycol, and the like, and mixtures thereof.

Experiment 6

1. This experiment was performed using a single sample/batch of Liquitint® Violet DD polymeric colorant cut with the solvent PEG 200 to a CV of approximately 4.5. UV/Vis spectrophotometer analysis showed that this 4.5 CV material contained at most about 1.75 wt % MtoI5EO.
2. The carrier material used was Natural Sodium Bentonite (AMCOL: 18061001).
3. Five separate mixtures were prepared:
a) 2 g of Violet DD described in 1 (Sample 6A)
b) 2 g of Violet DD described in 1+2 g PEG 200 (Sample 6B)
c) 2 g of Violet DD described in 1+2 g Vegetable Oil (Soybean Oil) (Sample 6C)
d) 2 g of Violet DD described in 1+2 g Oleic Acid (Sample 6D)
e) 2 g of Violet DD described in 1+2 g Mineral Oil (Sample 6E)
4. Each of the mixtures described in 3 was added to 50 g of the bentonite powder described in 2 and mixed using a food processor.
5. The resulting samples were allowed to dry in aluminum pans at room temperature overnight and then visually evaluated for intensity of color.

Results: The carrier-coloring agent composite prepared with Sample 6C was noticeably lighter in coloration than the carrier-coloring agent composite prepared with Sample 6D. The carrier-coloring agent composite prepared with Sample 6D was in turn lighter in coloration than the carrier-coloring agent composite prepared with Sample 6E. The carrier-coloring agent composite prepared with Sample 6A was slightly darker than the carrier-coloring agent composite prepared with Sample 6E. The carrier-coloring agent composite prepared with Sample 6B was the most intensely colored clay powder. It is believed that the mechanism of hiding the coloring agent on/within the carrier material is one in which the diluent (e.g. vegetable oil or oleic acid) suppresses the intensity of the coloring agent on/within the clay by limiting the amount of color that spreads onto the <90 micron fractions. The reason for the discrepancy in the mineral oil sample may be due to the fact that mineral oil and Violet DD are practically immiscible with one another.

Note: The distribution of color on the various size fractions of the clay is determined through sieve analysis followed by color extraction. Results are shown in Table 3 below.

TABLE 3

Various Diluents and Their Effect on Color Value in Less Than 90 Micron-Sized Carrier Material Particles

| Diluent | Wt % Total Color in <90 Micron Fractions | R |
|---|---|---|
| Sample 6A | 48.7% | N/A |
| Sample 6B | 53.7% | 0.9 |
| Sample 6C | 35.6% | 1.26 |
| Sample 6D | 44.7% | 1.08 |
| Sample 6E | 33.9% | 1.29 |

"N/A" means not applicable.

The results from Experiment 6 support the theory that diluents for which R>1 may be used to significantly reduce the appearance of color on the carrier-coloring agent composite.

Experiment 7

1. This experiment was performed using a single sample/batch of Liquitint® Violet DD cut with the solvent PEG 200 to a CV of approximately 4.0 and a single sample/batch of Liquitint Red OC
2. The carrier material used was SPV Bentonite (a natural sodium bentonite from AMCOL: 806A403).
3. Six separate mixtures were prepared:
a) 2 g of Violet DD described in 1 (Sample 7A)
b) 2 g of Violet DD described in 1+2 g DI Water (Sample 7B)
c) 2 g of Violet DD described in 1+0.6 g MtoI5EO+2 g DI Water (Sample 7C)
d) 2 g of Red OC described in 1 (Sample 7D)
e) 2 g of Red OC described in 1+2 g DI Water (Sample 7E)
f) 2 g of Red OC described in 1+0.6 g MtoI5EO+2 g DI Water (Sample 7F)
4. Sample 7A was added to 50 g of the bentonite powder described in 2 and mixed using a food processor.
5. 0.78 g of DI Water was then added to the mixture described in 4 and mixed using a food processor.
6. Sample 7D was added to 50 g of the bentonite powder described in 2 and mixed using a food processor.
7. 2 g of DI Water was then added to the mixture described in 6 and mixed using a food processor.
6. The mixtures described in 3b, c, e and f were each added to separate 50 g amounts of the bentonite powder described in 2 and mixed using a food processor.
7. The resulting samples were allowed to dry in aluminum pans at room temperature overnight and then visually evaluated for intensity of color.

Results: The carrier-coloring agent composite prepared with Sample 7B was noticeably lighter than the carrier-coloring agent composite prepared with Sample 7A. The carrier-coloring agent composite prepared with Sample 7C was the more colored than the carrier-coloring agent composite prepared with Sample 7A. The carrier-coloring agent composite prepared with Sample 7E was noticeably lighter than the carrier-coloring agent composite prepared with Sample 7D. The carrier-coloring agent composite prepared with Sample 7F was the more colored than the carrier-coloring agent composite prepared with Sample 7D. The results of Experiment 7 support the theory that the presence of tertiary aromatic amine solvent (MtoI5EO in this particular example) is detrimental to successfully hiding the coloring agent on the clay carrier material.

Experiment 8

1. This experiment was performed using the following uncharged (nonionic or neutral molecules) coloring agents: Liquitint® Violet DD polymeric colorant, Reactint® Violet X80 polymeric colorant, Red OC (azo hydrophobic polymeric colorant), Solvent Violet 13 (anthraquinone dye, non-polymeric, not water soluble), and Liquitint® Blue HP polymeric colorant.
2. The carrier material used was SPV Bentonite (AMCOL: 806A403).
3. Ten separate mixtures were prepared:
a) 2 g of Violet DD described in 1 (Sample 8A)
b) 2 g of Violet DD described in 1+2 g DI Water (Sample 8B)
c) 2 g of Violet X80 described in 1 (Sample 8C)
d) 2 g of Violet X80 described in 1+2 g DI Water (Sample 8D)
e) 2 g of Red OC described in 1 (Sample 8E)
f) 2 g of Red OC described in 1+2 g DI Water (Sample 8F)
g) 2 g of Solvent Violet 13 described in 1 (Sample 8G)
h) 2 g of Solvent Violet 13 described in 1+2 g DI Water (Sample 8H)
i) 2 g of Blue HP described in 1 (Sample 8I)
j) 2 g of Blue HP described in 1+2 g DI Water (Sample 8J)
4. Each sample described in 3a, c, e, g and i was added to 50 g of the bentonite powder described in 2 and mixed using a food processor.
5. 2 g of DI Water was then added to each of the mixtures described in 4 and mixed using a food processor.
6. Each of the mixtures described in 3b, d, f, h & i was added to 50 g of the bentonite powder described in 2 and mixed using a food processor.
7. The resulting samples were allowed to dry in aluminum pans at room temperature overnight and then visually evaluated for intensity of color.

Results: The carrier-coloring agent composite prepared with Sample 8B was noticeably lighter than the carrier-coloring agent composite prepared with Sample 8A. The carrier-coloring agent composite prepared with Sample 8D was noticeably lighter than the carrier-coloring agent composite prepared with Sample 8C. The carrier-coloring agent composite prepared with Sample 8F was noticeably lighter than the carrier-coloring agent composite prepared with Sample 8E. The carrier-coloring agent composite prepared with Sample 8H was noticeably lighter than the carrier-coloring agent composite prepared with Sample 8G. The carrier-coloring agent composite prepared with Sample 8J was noticeably lighter than the carrier-coloring agent composite prepared with Sample 8I. The results of Experiment 8 support the theory that a diluent like water, for which R>1, may be used to significantly reduce the appearance of color on the carrier-coloring agent composite when the coloring agents used are uncharged (nonionic or neutral molecules). The mechanism employed herein is control over the amount of coloring agent that spreads onto the carrier material (e.g. <90 micron clay fractions).

Experiment 9

1. This experiment was performed using Liquitint® Violet DD polymeric colorant and the following anionic dyes/colorants (each containing a negatively charged chromophore): Liquitint® E42-10 polymeric colorant, Direct Violet 9 and Direct Violet 66.
2. The carrier material used was SPV Bentonite (AMCOL: 806A403).
3. Eight separate mixtures were prepared:
a) 2 g of Violet DD described in 1 (Sample 9A)
b) 2 g of Violet DD described in 1+2 g DI Water (Sample 9B)

c) 2 g of E42-10 described in 1 (Sample 9C)
d) 2 g of E42-10 described in 1+2 g DI Water (Sample 9D)
e) 2 g of Direct Violet 9 described in 1 (Sample 9E)
f) 2 g of Direct Violet 9 described in 1+2 g DI Water (Sample 9F)
g) 2 g of Direct Violet 66 described in 1 (Sample 9G)
h) 2 g of Direct Violet 66 described in 1+2 g DI Water (Sample 9H)

4. Each sample described in 3a, c, e and g was added to 50 g of the bentonite powder described in 2 and mixed using a food processor.

5. 2 g of DI Water was then added to each of the mixtures described in 4 and mixed using a food processor.

6. Each of the mixtures described in 3b, d, f and h was added to 50 g of the bentonite powder described in 2 and mixed using a food processor.

7. The resulting samples were allowed to dry in aluminum pans at room temperature overnight and then visually evaluated for intensity of color.

Results: The carrier-coloring agent composite prepared with Sample 9B was noticeably lighter than the carrier-coloring agent composite prepared with Sample 9A. The carrier-coloring agent composite prepared with Sample 9D was noticeably lighter than the carrier-coloring agent composite prepared with Sample 9C. The carrier-coloring agent composite prepared with Sample 9F was noticeably lighter than the carrier-coloring agent composite prepared with Sample 9E. The carrier-coloring agent composite prepared with Sample 9H was noticeably lighter than the carrier-coloring agent composite prepared with Sample 9G. The results of Experiment 9 support the theory that a diluent like water, for which R>1, may be used to significantly reduce the appearance of color on the carrier-coloring agent composite using a polymeric colorant. In addition, it also demonstrates that a diluent like water, for which R>1, may be used to significantly reduce the appearance of color on the carrier-coloring agent composite when the coloring agents used are anionic. The mechanism employed herein is control over the amount of coloring agent that spreads onto the carrier material (e.g. <90 micron clay fractions).

Experiment 10

1. This experiment was performed using Liquitint® Violet DD and the following cationic dyes/colorants (each containing a positively charged chromophore): Basic Blue 9, Crystal Violet and Blue 452.

2. The carrier material used was SPV Bentonite (AM-COL: 806A403).

3. Eight separate mixtures were prepared:
a) 2 g of Violet DD described in 1 (Sample 10A)
b) 2 g of Violet DD described in 1+2 g DI Water (Sample 10B)
c) 2 g of Basic Blue 9 described in 1 (Sample 10C)
d) 2 g of Basic Blue 9 described in 1+2 g DI Water (Sample 10D)
e) 2 g of Crystal Violet described in 1 (Sample 10E)
f) 2 g of Crystal Violet described in 1+2 g DI Water (Sample 10F)
g) 2 g of Blue 452 described in 1 (Sample 10G)
h) 2 g of Blue 452 described in 1+2 g DI Water (Sample 10H)

4. Each sample described in 3a, c, e and g was added to 50 g of the bentonite powder described in 2 and mixed using a food processor.

5. 2 g of DI Water was then added to each of the mixtures described in 4 and mixed using a food processor.

6. Each of the mixtures described in 3b, d, f and h was added to 50 g of the bentonite powder described in 2 and mixed using a food processor.

7. The resulting samples were allowed to dry in aluminum pans at room temperature overnight and then visually evaluated for intensity of color.

Results: The carrier-coloring agent composite prepared with Sample 10B was noticeably lighter than the carrier-coloring agent composite prepared with Sample 10A. The carrier-coloring agent composite prepared with Sample 10D was noticeably lighter than the carrier-coloring agent composite prepared with Sample 10C. The carrier-coloring agent composite prepared with Sample 10F was noticeably lighter than the carrier-coloring agent composite prepared with Sample 10E. The carrier-coloring agent composite prepared with Sample 10H was noticeably lighter than the carrier-coloring agent composite prepared with Sample 10G. The results of Experiment 10 support the theory that a diluent like water, for which R>1, may be used to significantly reduce the appearance of color on the carrier-coloring agent composite using a polymeric colorant. In addition, it also demonstrates that a diluent like water, for which R>1, may be used to significantly reduce the appearance of color on the carrier-coloring agent composite when the coloring agents used are cationic. The mechanism employed herein is control over the amount of coloring agent that spreads onto the carrier material (e.g. <90 micron clay fractions).

Experiment 11

1. This experiment was performed using Liquitint® Violet DD and the following pigments: Pigment Blue 29 and Cyan 15.

2. The carrier material used was SPV Bentonite (AM-COL: 806A403).

3. Six separate mixtures were prepared:
a) 2 g of Violet DD described in 1 (Sample 11A)
b) 2 g of Violet DD described in 1+2 g DI Water (Sample 11B)
c) 2 g of Pigment Blue 29 described in 1 (Sample 11C)
d) 2 g of Pigment Blue 29 described in 1+2 g DI Water (Sample 11 D)
e) 2 g of Cyan 15 described in 1 (Sample 11E)
f) 2 g of Cyan 15 described in 1+2 g DI Water (Sample 11F)

4. Each sample described in 3a, c and e was added to 50 g of the bentonite powder described in 2 and mixed using a food processor.

5. 2 g of DI Water was then added to each of the mixtures described in 4 and mixed using a food processor.

6. Each of the mixtures described in 3b, d and f was added to 50 g of the bentonite powder described in 2 and mixed using a food processor.

7. The resulting samples were allowed to dry in aluminum pans at room temperature overnight and then visually evaluated for intensity of color.

Results: The carrier-coloring agent composite prepared with Sample 11B was noticeably lighter than the carrier-coloring agent composite prepared with Sample 11A. The carrier-coloring agent composite prepared with Sample 11D was noticeably lighter than the carrier-coloring agent composite prepared with Sample 11C. The carrier-coloring agent composite prepared with Sample 11F was noticeably lighter than the carrier-coloring agent composite prepared with Sample 11E. The results of Experiment 11 support the theory that a diluent like water, for which R>1, may be used to significantly reduce the appearance of color on the carrier-coloring agent composite using a polymeric colorant.

In addition, it also demonstrates that a diluent like water, for which R>1, may be used to significantly reduce the appearance of color on the carrier-coloring agent composite when the coloring agents used are pigments. The mechanism employed herein is control over the amount of coloring agent that spreads onto the carrier material (e.g. <90 micron clay fractions).

Experiment 12

1. This experiment was performed using Liquitint® Violet DD.
2. The carrier materials used included SPV Bentonite (AMCOL: 806A403), Montmorillonite (46E 0438: Ward's), Swy-2 Na-rich Montmorillonite (Source Clays Repository), and Natural Sodium Bentonite (AMCOL: 18061001).
3. A 1:1 mixture of Violet DD described in 1 and DI Water was prepared.
4. 4 g of the mixture described in 3 was added to 50 g of the bentonite powders described in 2 and mixed using a food processor.
5. The resulting samples were allowed to dry in aluminum pans at room temperature overnight and then visually evaluated for intensity of color.

Results: The color was successfully hidden (occult particles were produced) on all the bentonites tested in this experiment. Experiment 12 shows that a diluent like water, for which R>1, may be used to significantly reduce the appearance of color on the carrier-coloring agent composite regardless of the source of natural sodium bentonite carrier material. The mechanism employed herein is control over the amount of coloring agent that spreads onto the carrier material (e.g. <90 micron clay fractions).

Experiment 13

1. This experiment was performed using Liquitint® Violet DD.
2. The carrier materials used included Ca-Bentonite (AMCOL: 0804201503), Fully Activated Bentonite (AMCOL: 26100904) and Natural Sodium Bentonite (AMCOL: 18061001).
3. 2 g of the Violet DD described in 1 was added to 50 g of the bentonite powders described in 2 and mixed using a food processor (Control Samples).
4. A 1:1 mixture of Violet DD described in 1 and DI Water was prepared.
5. 4 g of the mixture described in 4 was added to 50 g of the bentonite powders described in 2 and mixed using a food processor (Trial Samples).
6. The resulting samples were allowed to dry in aluminum pans at room temperature overnight and then visually evaluated for intensity of color.

Results: For all three types of bentonite used in this experiment, the Trial Samples were noticeably lighter than the Control Samples. Experiment 13 shows that a diluent like water, for which R>1, may be used to significantly reduce the appearance of color on the carrier-coloring agent composite independent of the type of bentonite carrier (natural bentonite or synthetic bentonite, Na bentonite or Ca bentonite). The mechanism employed herein is control over the amount of coloring agent that spreads onto the carrier material (e.g. <90 micron clay fractions).

Experiment 14

1. Pure/Uncut Liquitint® E42-10 polymeric colorant was cut with DI Water to CV=2.84
2. Pure/Uncut Liquitint® E42-10 polymeric colorant was cut with PEG200 to CV=4.67
3. Pure/Uncut Liquitint® E42-10 polymeric colorant was cut with 7.72 wt % aqueous solution of Poval 5-88 (Polyvinyl Alcohol from Kuraray) to CV=2.82
4. The carrier material used was SPV Bentonite (AMCOL: 18111501).
5. Four separate solutions were prepared:
   a) 1 g of E42-10 described in 2+1.5 g DI Water (Sample 14A)
   b) 1 g of E42-10 described in 1 (Sample 14B)
   c) 1 g of E42-10 described in 2+1.51 g (7.72 wt %) aqueous solution of Poval 5-88 (Sample 14C)
   d) 1 g of E42-10 described in 3 (Sample 14D)
6. 0.608 g of the solution described in 5(a) was added to 5 g of the bentonite powder described in 2 and mixed using a FlackTek Speed Mixer with 3 ceramic grinding aids added to the container (Mix A).
7. 0.397 g of the solution described in 5(b) was added to 5 g of the bentonite powder described in 2 and mixed using a FlackTek Speed Mixer with 3 ceramic grinding aids added to the container (Mix B).
8. 0.612 g of the solution described in 5(c) was added to 5 g of the bentonite powder described in 2 and mixed using a FlackTek Speed Mixer with 3 ceramic grinding aids added to the container (Mix C).
9. 0.4 g of the solution described in 5(d) was added to 5 g of the bentonite powder described in 2 and mixed using a FlackTek Speed Mixer with 3 ceramic grinding aids added to the container (Mix D).
10. The resulting samples were allowed to dry in aluminum pans at room temperature overnight and reground.
11. A mixture of 5 wt % Neodol 45-7 (Non-ionic surfactant) and 95 wt % AATCC powdered detergent was prepared.
12. A mixture comprising 1 wt % Mix A, 99 wt % mix from 11 was prepared (Detergent Sample A)
13. A mixture comprising 1 wt % Mix B, 99 wt % mix from 11 was prepared (Detergent Sample B)
14. A mixture comprising 1 wt % Mix C, 99 wt % mix from 11 was prepared (Detergent Sample C)
15. A mixture comprising 1 wt % Mix D, 99 wt % mix from 11 was prepared (Detergent Sample D)
16. Detergent Samples A-D were stored in glass vials at 40 C for 2 days and subsequently visually evaluated for intensity of color.

Results: Detergent Sample A was slightly less colored than Detergent Sample B. Detergent Sample C was significantly less colored than Detergent Sample A. Detergent Sample D was less colored than Detergent Sample B. Detergent Sample C was noticeably less colored than Detergent Sample D. These results show that the presence of a film former helps mitigate potential bleed issues. The film former used in this experiment was the water soluble, film forming polymer polyvinyl alcohol. This experiment also shows that the presence of PEG 200 in the color premix aids in bleed suppression. PEG 200 is a known plasticizer for polyvinyl alcohol. Without being bound by theory we speculate that the presence of the PEG 200 in the color premix aids polyvinyl alcohol film formation, resulting in improved resistance to bleed.

Experiment 15

1. 2.5 g of the carrier-coloring agent composite prepared with Sample 9C was mixed with 97.5 g of Persil Power Detergent (Henkel) by shaking and subsequent rolling for ~3 hrs. (Control)

2. 2.5 g of the carrier-coloring agent composite prepared with Sample 9D was mixed with 97.5 g of Persil Power Detergent (Henkel) by shaking and subsequent rolling for ~3 hrs. (Trial)

3. Control and Trial detergent samples were then stored for 4 days at 50° C. in closed jars.

Results: The Trial detergent sample remained uncolored while the Control detergent sample turned pink. These results show that a diluent like water, for which R>1, may be used to significantly reduce the bleeding risk by limiting the amount of color that spreads onto the carrier material.

Thus, the above description and examples show that the inventive occult particles, wherein the coloring agent is hidden on/within a carrier material, are indiscernible in non-colored (e.g. white) detergent compositions in which they may be combined. As has been described herein, the inventive occult particles possess a significant advantage over currently available colored speckles by exhibiting this "hiding" feature, while also exhibiting the characteristics of being non-staining to textile substrates and also providing good release of the coloring agent into wash water. As such, the present occult particles represent a useful advance over the prior art.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

We claim:

1. An occult particle comprising:
   a) a majority by weight of at least one carrier material, and
   b) at least one color premix material, wherein the color premix material is comprised of:
      (i) At least one cut color wherein the cut color contains less than 25 wt % of a tertiary aromatic amine, and
      (ii) At least one diluent having R>1, wherein the at least one diluent is selected from glycerol, propylene carbonate, ethylene glycol and mixtures thereof, and
   wherein the at least one carrier material and the at least one color premix material form a carrier-color premix composite; and
   wherein the carrier-color premix composite is substantially indiscernible in a non-colored granular or powdered laundry care composition.

2. The occult particle of claim 1, wherein the at least one carrier material is a clay.

3. The occult particle of claim 2, wherein the clay is a smectite clay.

4. The occult particle of claim 3, wherein the smectite clay is a bentonite clay.

5. The occult particle of claim 4, wherein the bentonite clay is a natural sodium bentonite clay.

6. The occult particle of claim 1, wherein the at least one carrier material comprises a majority by weight of particles less than 0.5 mm in size.

7. The occult particle of claim 1, wherein the at least one carrier material comprises a majority by weight of particles less than 0.25 mm in size.

8. The occult particle of claim 1, wherein the cut color contains a coloring agent selected from the group consisting of polymeric colorants, acid dyes, basic dyes, direct dyes, solvent dyes, vat dyes, mordant dyes, indigoid dyes, reactive dyes, disperse dyes, sulfur dyes, fluorescent dyes, inorganic pigments, organic pigments, natural colorants, and mixtures thereof.

9. The occult particle of claim 8, wherein the coloring agent is a polymeric colorant.

10. The occult particle of claim 8, wherein the coloring agent is comprised of a blend or mixture of a polymeric colorant and a non-polymeric colorant.

11. The occult particle of claim 9, wherein the polymeric colorant is characterized by having a chromophore group selected from the group consisting of nitroso, nitro, azo, stilbene, bis-stilbene, biphenyl, oligophenethylene, fluorene, coumarin, napthalamide, diarylmethane, triarylmethane, xanthene acridine, quinoline, methine, thiazole, indamine, indophenol, azine, thiazine, oxazine, aminoketone, hydroxyketone, anthraquinone, indigoid, phthalocyanine chromophore groups, and mixtures thereof.

12. The occult particle of claim 1, wherein the cut color contains a chromophore that is a neutral molecule or an uncharged molecule.

13. The occult particle of claim 1, wherein the cut color contains a nonionic chromophore.

14. The occult particle of claim 1, wherein the cut color contains an anionic chromophore.

15. The occult particle of claim 1, wherein the cut color contains a cationic chromophore.

16. The occult particle of claim 1, wherein the cut color contains a chromophore having both positive and negative charges.

17. The occult particle of claim 1, wherein the cut color contains a chromophore that is zwitterionic or amphoteric.

18. The occult particle of claim 1, wherein the cut color contains a pigment.

19. The occult particle of claim 1, wherein the cut color contains less than 15 wt % of a tertiary aromatic amine.

20. The occult particle of claim 1, wherein the cut color contains less than 10 wt % of a tertiary aromatic amine.

21. The occult particle of claim 1, wherein the cut color contains less than 5 wt % of a tertiary aromatic amine.

22. The occult particle of claim 1, wherein the at least one diluent is water soluble.

23. The occult particle of claim 1, wherein the at least one diluent has a log Kow>3.

24. The occult particle of claim 23, wherein the at least one diluent is selected from vegetable oils, essential oils, fatty acids, mineral oils, paraffins, hydrocarbons and mixtures thereof.

25. The occult particle of claim 1, wherein the occult particle further includes a film former.

26. The occult particle of claim 25, wherein the film former is a water soluble polymer.

27. The occult particle of claim 25, wherein the film former is in the form of an aqueous dispersion.

28. The occult particle of claim 1, wherein the color premix includes a film former.

29. A laundry care composition comprising the occult particle of claim 1.

* * * * *